US012772937B2

(12) United States Patent
Ball et al.

(10) Patent No.: US 12,772,937 B2
(45) Date of Patent: Oct. 27, 2026

(54) SYSTEM FOR MONITORING ENCLOSED GROWING ENVIRONMENT

(71) Applicant: Heliponix, LLC, Evansville, IN (US)

(72) Inventors: Ivan Lee Ball, Owensville, IN (US); Scott Thomas Massey, Evansville, IN (US)

(73) Assignee: Heliponix, LLC, Evansville, IN (US)

( * ) Notice: Subject to any disclaimer, the term of this patent is extended or adjusted under 35 U.S.C. 154(b) by 0 days.

(21) Appl. No.: 18/257,190

(22) PCT Filed: Jan. 27, 2022

(86) PCT No.: PCT/US2022/013995
§ 371 (c)(1),
(2) Date: Jun. 13, 2023

(87) PCT Pub. No.: WO2022/164963
PCT Pub. Date: Aug. 4, 2022

(65) Prior Publication Data

US 2024/0032485 A1 Feb. 1, 2024

Related U.S. Application Data

(60) Provisional application No. 63/199,838, filed on Jan. 28, 2021.

(51) Int. Cl.
*A01G 9/26* (2006.01)
*A01G 7/04* (2006.01)
(Continued)

(52) U.S. Cl.
CPC ............. *A01G 9/249* (2019.05); *A01G 7/045* (2013.01); *A01G 9/023* (2013.01); *A01G 9/26* (2013.01); *H05B 47/105* (2020.01)

(58) Field of Classification Search
CPC ........ A01G 7/045; A01G 31/06; A01G 31/02; A01G 31/00; A01G 9/249; A01G 9/023; A01G 9/26; H05B 47/10
See application file for complete search history.

(56) References Cited

U.S. PATENT DOCUMENTS 3,931,695 A * 1/1976 Widmayer ............. A01G 9/249 47/60
4,250,666 A * 2/1981 Rakestraw ............. A01G 9/023 47/DIG. 6
(Continued)

FOREIGN PATENT DOCUMENTS

CN 107734964 A 2/2018
CN 112042483 A 12/2020
(Continued)

OTHER PUBLICATIONS

International Search Report and Written Opinion for PCT Application No. PCT/US22/13995, mailed Apr. 26, 2022.
(Continued)

*Primary Examiner* — Magdalena Topolski
*Assistant Examiner* — Spencer T Callaway
(74) *Attorney, Agent, or Firm* — Lee & Hayes, P.C.

(57) ABSTRACT

A system associated with an enclosure for providing a controlled environment for growing of plants, produce, and the like. The system may be configured to provide customized illumination to individual plants based on the plant species, size, health, and/or stage of lift. In some cases, the system may include multiple sensors for capturing data associated with the enclosure to, thereby, identify plants and provide customized illumination.

20 Claims, 17 Drawing Sheets

(51) Int. Cl.

| | |
|---|---|
| ***A01G 9/02*** | (2018.01) |
| ***A01G 9/14*** | (2006.01) |
| ***A01G 9/24*** | (2006.01) |
| ***G06Q 50/02*** | (2024.01) |
| ***H05B 47/105*** | (2020.01) |

(56) References Cited

U.S. PATENT DOCUMENTS

| | | | | |
|---|---|---|---|---|
| 8,358,097 | B2 * | 1/2013 | Cartwright | F21V 21/15 396/4 |
| 9,374,952 | B1 * | 6/2016 | Cross | A01G 31/047 |
| 9,872,357 | B1 | 1/2018 | Aikala | |
| 2008/0148630 | A1 | 6/2008 | Ryan et al. | |
| 2012/0137578 | A1 * | 6/2012 | Bradford | A01G 9/143 47/65.5 |
| 2016/0007126 | A1 | 1/2016 | Sunohara | |
| 2016/0007426 | A1 * | 1/2016 | Ashdown | H05B 47/11 700/90 |
| 2017/0099790 | A1 * | 4/2017 | Gonyer | H05B 47/11 |
| 2018/0007845 | A1 | 1/2018 | Martin | |
| 2018/0359975 | A1 * | 12/2018 | Millar | G05B 15/02 |
| 2019/0082627 | A1 * | 3/2019 | Moffitt | B65D 88/74 |
| 2019/0200542 | A1 * | 7/2019 | Hall | A01G 7/02 |
| 2020/0037514 | A1 | 2/2020 | Massey | |
| 2020/0333782 | A1 * | 10/2020 | Kent | G05D 1/0022 |
| 2020/0344965 | A1 * | 11/2020 | Song | A01G 7/00 |
| 2020/0380438 | A1 * | 12/2020 | Briggs | A01G 9/0295 |
| 2021/0084831 | A1 * | 3/2021 | Hunter | A01G 9/24 |

FOREIGN PATENT DOCUMENTS

| | | | | |
|---|---|---|---|---|
| EP | 0253082 | A2 * | 1/1988 | |
| EP | 0425595 | A1 | 5/1995 | |
| EP | 3330905 | A1 * | 6/2018 | G06N 7/00 |
| JP | 2014103958 | A | 6/2014 | |
| NL | 8401090 | A * | 11/1985 | A01G 9/249 |
| WO | WO2019157598 | A1 | 8/2019 | |
| WO | WO2020023504 | A1 | 1/2020 | |
| WO | WO2020041242 | A1 | 2/2020 | |

OTHER PUBLICATIONS

Office Action for United Arab Emirates Application No. P6001858/2023, Dated Dec. 7, 2024, 9 pages.

Office Action for European Application No. 22703820.5, Dated Dec. 4, 2024, 4 pages.

Office Action for Chinese Application No. 202280012091.3, Dated Jun. 23, 2025, 18 pages.

Office Action for European Application No. 22703820.5, Dated Jul. 7, 2025, 4 pages.

Office Action for Japanese Application No. 2023-542476, Dated Jul. 8, 2025, 7 pages.

Office Action for Chinese Application No. 202280012091.3, Dated Feb. 5, 2026, 17 pages.

Office Action for Israeli Application No. 304105, Dated Jan. 27, 2026, 6 pages.

Examination Report for New Zealand Application No. 801462, Dated Mar. 27, 2026, 3 pages.

* cited by examiner

SYSTEM FOR MONITORING ENCLOSED GROWING ENVIRONMENT

CROSS-REFERENCE TO RELATED APPLICATION(S)

This application is a U.S. national stage application under 35 USC § 371 of International Application No. PCT/US22/13995 filed on Jan. 27, 2022 and entitled "SYSTEM FOR MONITORING ENCLOSED GROWING ENVIRONMENT, which claims priority to U.S. Provisional Application No. 63/199,838 filed on Jan. 28, 2021 and entitled "SYSTEM FOR MONITORING ENCLOSED GROWING ENVIRONMENT" the entire contents of which are incorporated herein by reference.

BACKGROUND

Home gardening and usage of micro gardens in the apartment complexes and neighborhoods has grown in recent years throughout the United States in response to food deserts limiting the availability of fresh produce in densely populated areas. More consumers desire to have fresh produce and herbs grown at home to provide fresher produce, as well as limit the preservatives and chemicals used in large grocery stores. Depending on climate, homeowners may be limited to indoor systems for growing fresh produce and herbs. However, most indoor systems are limited in space and provide unitary growing conditions for all produce and herbs that often results in suboptimal conditions for all produce and herbs being produced by the homeowner. Additionally, homeowners often lack the education and time to properly maintain optimal growth conditions for each individual species and type of plant.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
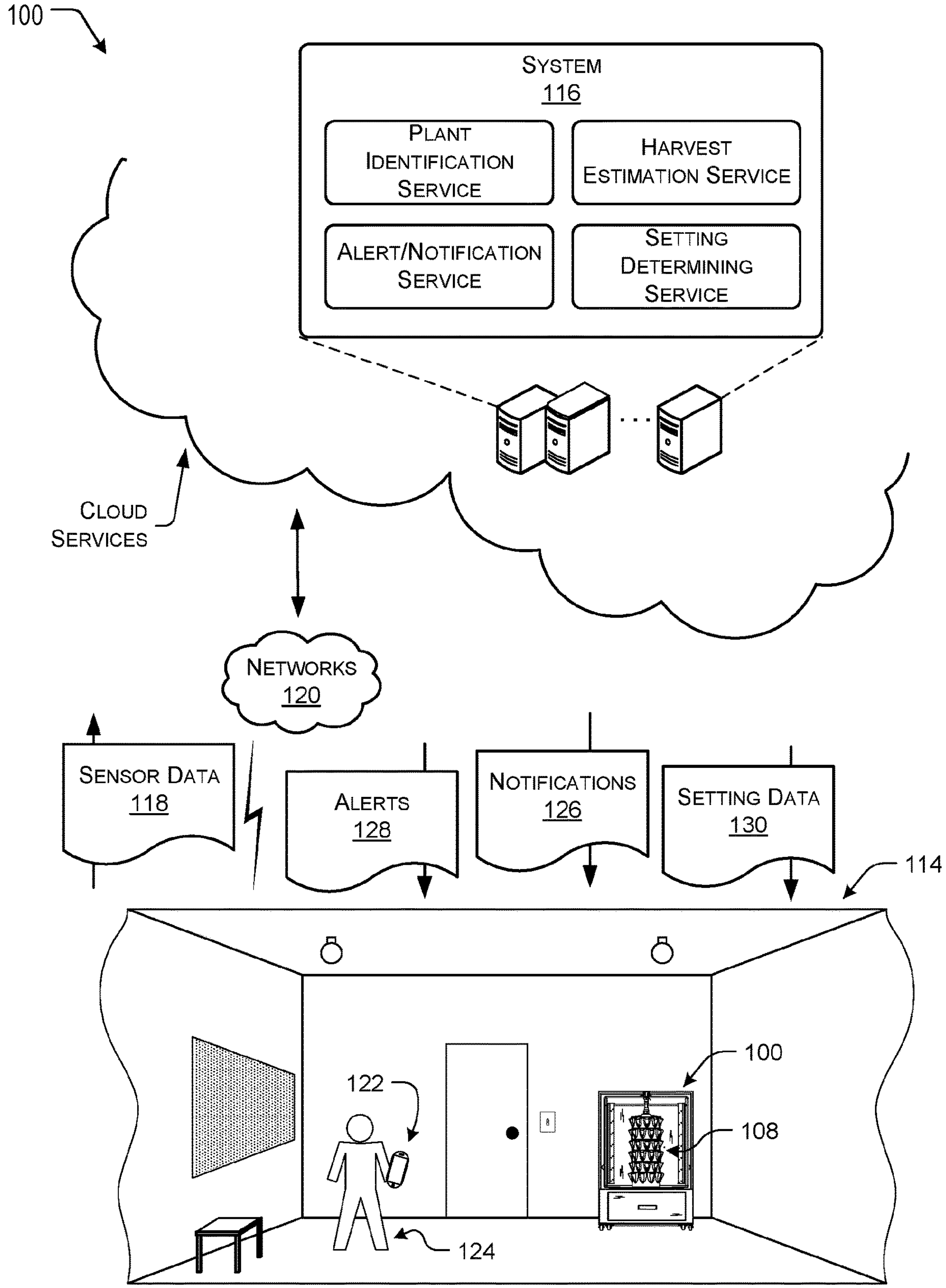
FIG. 1 is an example diagram of a cloud-based service associated with an enclosure according to some implementations.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Discussed herein are systems and apparatuses for automated and assisted monitoring and environmental control of at home and micro gardens. For example, the systems, discussed herein, may be configured to provide an enclosed growing environment for at home and indoor cultivation of plants and fungi, flowers, produce, mushrooms, and/or herbs. The system may, in some implementations, provide an isolated enclosure that is configured to provide stable and controlled environmental conditions, physically separated from the conditions within the surrounding environment (e.g., the home or apartment). However, unlike conventional home garden systems that provide uniform lighting and temperature, the enclosure discussed herein may provide active monitoring and adaptive environmental conditions based on the health, stage of growth, type or species of plants, and the like.

In some specific implementations, the system may be configured to monitor individual plant(s) within the growing environment and to provide tailored growing conditions, such as custom lighting (e.g., length of exposure via tower rotation, tilt, and/or angular positioning/orientation, focal length, temperature, specific wavelengths, intensity, amount, and the like). In some cases, the individual growing conditions may be based on a detected or determined health, size, and/or stage of growth or reproduction of an individual plant within the enclosure in addition to the type or species of the individual plant. Further, the system may be used to induce post-harvesting drying conditions at the end of the plants' growth cycle.

In one implementation, the system may include a planting column or tower within the enclosure. The planting column may comprise a singularity, or plurality of receptacle configured to receive individual plant(s). The planting receptacles may be arranged both in vertical columns and horizontal rows about the planting column. For instance, in one specific example, the planting column may include twenty columns and five rows of planting receptacles. In some cases, the planting receptacles may be staggered between the columns, such that each column has one planting receptacle for every other row. In these cases, staggering the planting receptacles allows the system to be able to monitor each individual plant as well as allowing each individual plant sufficient room to grow.

In some cases, the planting column may be partially, or fully rotatable three-hundred and sixty degrees within the enclosure and about a base, or any other limited rotation. For example, a drive motor may be configured to mechanically or magnetically rotate the planting column within the enclosure based on one or more control signals from a monitoring and control system. In some instances, as the planting column rotates, each individual planting receptacle may be assigned a unique identifier, such that the system is able to track each plant based on a determined location within the planting column. In these instances, the system may determine the assigned location of a plant upon insertion or planting within a specific planting receptacle. For example, a planting receptacle may have a visible marking or invisible marking (e.g., an infrared spectrum mark) that the system may read upon insertion of a planting pod. In other cases, the system may determine that a receptacle has been filled as the planting column rotates. In some cases, markings for location determination may also be placed at various positions about the interior surfaces of the enclosure and/or the top and bottom of the planting column to assist with initialization or location determination upon restart or reboot of the system as well as in response to an upgrade or replacement lighting and control column being installed or calibrated.

In some implementations, a lighting and control column, or panel may be configured within the enclosure or along a specific region of the enclosure. The lighting and control column may be equipped with various sensors for monitoring the individual plants. For example, the lighting and control column may be equipped with one or more sensors, such as image devices (e.g., red-green-blue image devices, infrared image devices, monochrome image devices, lidar devices, and the like), humidity sensors, temperature sensors, carbon dioxide ($CO_2$) sensors, spectral sensors, and the like. The lighting and control column may also be equipped with one or more illuminators (such as visible lights, infrared illuminators, ultraviolet lights, lasers, projectors, and the like). The illuminators may be adjustable to provide specific spectrums, amounts of light, and intensities of light to each individual planting receptacle based on the corresponding plant's health, life stage, size, and type or species.

In some cases, the lighting and control column may also include multiple rows of sensors and/or illuminators. For example, the lighting control column may include an upper row of sensors and/or illuminators, a middle row of sensors and/or illuminators, and a bottom row of sensors and/or illuminators. In other cases, the lighting and control column may include a row of sensors and/or illuminators for each corresponding row of the planting column. In some implementations, a field of view or a region of interest associated with each of the sensors and/or illuminators may be adjustable such that a single sensor and/or illuminator may, respectively, capture data and provide light to multiple planting receptacles while maintaining individual per plant spectrum, amount, and intensity characteristics.

In some implementations, in addition to the sensors of the lighting and control column, sensors, illuminators, and the like may be positioned above the planting column, such that the sensors have an aerial view of the plating column associated with plants. In one example, the sensors may include one or more image capture devices positioned over or on top of the growing chamber facing downwards with a field of view of a front region of the planting column or tower, such as would be visible to a user opening the door of the enclosure. In another example, the overhead sensors may include multiple sensors positioned about the top surface of the enclosure, such as in each corner, corresponding to each side wall, and the like. In this example, the combination of sensors may provide a top down view of the enclosure as well as a 360 degree view of the planting column including the front view.

In some cases, the overhead sensors may be used to track and/or monitor the planting, pruning, harvesting, cleaning, and assembly of the seed pods, growth rings, and any other component, life stage, maintenance, or consumable associated with the enclosure. The sensor data (e.g., image data and the like) may also be used to assist or guide the user experience of farming with the system discussed herein. This experience may include an onboard touch glass interface, mobile application, audible commands, or any other type of machine to human interface. As an illustrative example, if a user plants a basil plant in the top ring section or row of the planting column, the basil may, as a tall growing plant, impact the top of the growing enclosure. In this example, if the system detects within the overhead sensor (or other sensors) data that the basil seed pod has been placed outside of a defined recommended planting region with respect to the plating column, the system may notify the user via the mobile application. The notification may include planting instructions to relocate the basil seed pod to another lower receptacle within a recommended region. In this manner, the system may include many different recommended regions associated with the planting column. Each of the recommended regions may correspond to a different type or species of plant.

As one illustrative example, the system may determine an amount of light that is appropriate for a particular plant by determining from the sensor data an amount of reflection associated with, for instance, the leaves of a plant within one or more wavelengths (such as the infrared spectrum). The system may then adjust the amount, spectrum, and intensity of the light such that the leaves are absorbing within a threshold amount of 100% of the light being provided by the plant column rotation control. In this manner, the plant does not receive excess light and the system reduces overall power consumption when compared with conventional indoor growing systems.

In one particular implementation, the enclosure may also include one or more sensors and/or illuminators along a top surface or ceiling in addition to the sensors and/or illuminators associated with the lighting and control column to further assist with capturing data and providing custom lighting to individual plants for modifying taste and nutrition based from a user or family preference.

In some implementations, the system may also be configured to provide data, analytics, and notifications/alerts/messages to the owner or user of the system. For example, the system may be in wireless communication with a network or user device associated with the owner. The system may analyze the captured sensor data with respect to each individual plant to determine a life stage and health associated therewith. In some cases, the system may provide a progress report, such as a growth scorecard, on a periodic basis (e.g., daily, weekly, monthly, etc.) that may be presented to the user via the user device, mobile device, and/or, for instance, an associated application hosted by the user mobile device. In some instances, the periodic basis may be defined by the user, determined based on the type and species of plants within the enclosure, an age or life stage of the plants within the enclosure, a number of plants within the enclosure, and/or a combination thereof.

In other examples, the notification, alert, or message may also include a three-dimensional model of the planting column and each plant within the enclosure. In some cases, the three-dimensional model may accurately represent the location, size, shape, and current status of the individual plants, such as at a given time. In these cases, the user may be able to both view the model from a 360 degree view via a user interface, such as on the user device but also to view the model over time (such as via a time-lapse or adjustable time scale). In some specific example, the system may record a three-dimensional model per a predetermined number of rotations of the planting column (e.g., 1, 3, 5, 10, and the like) and/or at predetermined period of time (such as every 10 minutes, every hour, every day, every week and the like). In some cases, the three-dimensional model may include multiple views (such as heatmaps) that may represent statuses of the plants, such as health, maturity, exposure time, exposure wavelengths, exposure intensity, and the like). In this manner, the user may quickly view the progress, status, and changes to the plants within the enclosure.

In some instances, the system may also determine if there are any concerns or issues with the health and wellbeing of a plant. For example, if the system detects wilting, unusual reflections, reduced absorption, drooping and the like associated with the plant, the system may generate a notification or alert so that the user may inspect or intervene in the health of the plant. For instance, if a plant has become sick or harmful insects were introduced, the user may remove the plant and/or the entire planting column to reduce long term damage to the overall crop output of the system.

In some implementations, the system may also provide a harvest alert or message to the user for each individual plant. For instance, the system may determine based on the sensor data that a plant has reached between 90 and 95 percent of its maximum growth and should be harvested to improve overall yields of the system and to optimize taste (e.g., prevent bitterness that may occur when the plant starts to decay or stress). In some instances, the harvest thresholds (e.g., size, life stage, growth potential, taste, and the like) may be selected by the system based at least in part on a user input, such as the type of preparation (e.g., salad, cooked, dried, and the like) the user plans for the particular plant or plants. For instance, earlier harvesting of plants may improve taste when the plant is eaten raw while later harvesting may increase yields, which may be preferred when the plant is being cooked.

In some cases, when a harvest is initiated, such as by a user opening a door of the enclosure, the system may cause the planting column to rotate, tilt, or otherwise adjust position to orientate the planting receptacle continuing ready to harvest plants towards the opening of the door for ease of harvesting by the user. In some cases, the system may allow the user to select plants (via the application on the user device and/or a user interface on the enclosure) and the system may orient the planting column to present to the opening the receptacle housing the selected plants. In some cases, the system may cause the planting column to open the plant selected by the user that is most ready to harvest (e.g., most mature, most oversized, most in need of pruning, or the like).

In some cases, the system or a cloud-based service associated with and in communication with the system may be configured to generate health, harvest, and taste thresholds for the growth of individual species and types of plants based on past yield and harvest conditions of the system, on past yield and harvest conditions of other systems, and various user inputs (such as answers to user surveys or notifications, user harvest preferences, user's meal preparation preferences, and the like). For example, the system may input the sensor data and/or user preferences and habits into one or more machine learned models that may output various conditions and thresholds associated with the system, such as notification or alert thresholds, plant health thresholds, lighting control thresholds, harvest thresholds, plant column rotation speed thresholds, and the like. In some case, the system may also provide discard alerts or warnings, such as when a plant is unhealthy or infected in a manner that risks the reminder of the harvest, or when there is an unexpected slow growth rate (e.g., a growth rate less than a threshold amount based on the type or species, age, etc. of the particular plant).

In some specific examples, the system or the cloud-based service may determine from the sensor data an estimated yield of the harvest for the user. The estimated yields may include a range and/or different yield amounts based on usage and/or harvest times. In some cases, the estimated yields may include data associated with different amounts based on the taste preferences of the user (such as higher yields for longer growth periods but increased bitterness in greens and the like).

In one specific example, the system may also use machine learned models to perform object detection and classification on the plants. For instance, one or more neural networks may generate any number of learned inferences or heads. In some cases, the neural network may be a trained network architecture that is end-to-end. In one example, the machine learned models may include segmenting and/or classifying extracted deep convolutional features of the sensor data into semantic data (e.g., rigidity, light absorption, color, health, life stage, etc.). In some cases, appropriate truth outputs of the model in the form semantic per-pixel classifications (e.g., foliage, stem, fruit, vegetable, bug, decay, etc.).

In some cases, planting pods may be marked with a visible or invisible spectrum (e.g., infrared spectrum) that the system may read upon insertion of a pod into a planting receptacle. The marking may indicate a type or species of plant associated with the planting pod as well as other information, such as an age of the pod and the like. In other cases, the planting receptacles of the planting column may include an electrical or magnetic coupling such that the system is able to detect an insertion and determine the information associated with the pod upon insertion.

In some examples, a cloud-based system may be configured to receive and aggregate data associated with multiple enclosures. In some cases, the cloud-based system may process the data associated with the plants received from each of the multiple enclosures in order to determine adjustments to intrinsic parameters of the various sensors and systems of the enclosure. For example, the cloud-based system may apply one or more machine learned models, as discussed above and below, to determine parameters associated with the sensor that may be adjusted in future models or units of the enclosure. For example, the cloud-based system may input the captured data into a machine learned model and the model may output adaptations for use in lens, focus, shutters, and the like of the sensors. The cloud-based system may also output settings or adjustable characteristics (such as lighting parameters, humidity or moisture parameters, dynamic sensor settings, and the like) which may be downloaded or applied to one or more of active enclosures.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing technique and/or a combination thereof.

In one specific example, upon initialization or installations of a planting column and/or lighting and control column, the system may perform a lactonization process. For example, the sensor system may capture a set of images or frames of sensor data. The system may detect markers within the field of view of the sensor systems based at least in part on the set of images. In this example, each detected marker may indicate a location of the capturing sensor (e.g., a three-dimensional position and rotation) relative to the frame of the enclosure or, for instance, a base of the planting column. The system may then perform an error minimization technique (e.g., a least squares technique) based at least in part on a known model of the enclosure and the sensor location to determine a sensor position relative to the frame and to the planting column. The system may then compose the sensor position relative to the frame and the sensor position relative to the planting column to determine a final position of the sensor relative to the frame and the planting column.

The system may then determine the position of the sensor relative to the individual planting receptacles based on the final position of the sensor relative to the frame and the planting tower and a known model of the planting column. In some cases, the system may also determine the position of one or more illuminators or emitters relative to each individual planting receptacle by composing the position of the sensor relative to the individual planting receptacles and a known transform (such as a six-degree of freedom transform) between the position of the sensor and the position of the illuminator or emitter. In this manner, the system may then direct or provide individualized lighting characteristics to each of the individual plants within each individual planting receptacle.

In some specific examples, the system may identify individual plants within the planting column using image data generated by the image devices of the lighting and control column. For instance, the system may capture one or more images or frames of the planting column. The system may then determine a position of each of the individual plants relative to a known position of the image device. For instance, the system may project the plant's position or location into the image device frame using geometric calculations. The system may then select a region of interest (e.g., rectangular, trapezoidal, customized based on a bounding box of the plant, and/or the like) associated with the position of an individual plant based at least in part on the image device frame. The system may label pixels in the region of interest using a semantic segmentation and/or classification technique. For example, the system may input the image data within the region of interest into a machine learned model and receive a plant type or species, age, health, etc. as an output from the machine learned model. The system may then assign the data outputs of the machine-learned model to each pixel of the region of interest, such as metadata to the image data.

In other specific examples, the system may be configured to disengage or turn off any lights or illuminators within the enclosure. In this manner, the system may reduce the ambient light associated with the enclosure. In some cases, the system may be configured to perform the following operations at specific times of day (such as at night) to further reduce the ambient light within the enclosure. In other cases, the system may cause a door window covering to close, tint, frost, decrease transparency, or otherwise shade the interior of the enclosure. The system may engage or activate a spectral sensor and a desired illuminator or emitter (such as an infrared illuminator). The system may also rotate the planting column while the sensor and illuminator are engaged to generate image data associated with the entire surface of the planting column. The system may perform segmentation and/or classification on the image data for each planting receptacle, as discussed above. In some cases, based on the output of the segmentation and/or classification networks, the system may determine a position of a plant associated with each planting receptacle that maximizes the pixels corresponding to each individual plant. In some cases, the system may utilize a sliding window representation of the illuminator or emitters field of view over the segmented and/or classified image data. The system may then determine a number of pixels for each plant within each planting receptacle. At any step of the example process, the system may cause the illuminator or emitter to disengage (e.g. turn off) and the spectral sensor to capture baseline reflectance data associated with one or more of the individual plants.

In the current example specific examples, the system may then cause the illuminator or emitter to articulate or arrange such that the field of view of the illuminator or emitter is associated with the pixels determined above. The illuminator or emitter may then be engaged (or re-engaged) for a desired period of time (e.g., a period of time selected based on the type, age, health, etc. of the associated plant) and at a desired spectrum(s) or wavelength(s) (e.g., near infrared, infrared, ultraviolet, visible, and the like). The spectral sensor may, during the period of time, capture additional sensor and/or image data associated with the plant. The system may then determine reflected response data at the various spectrum(s) and/or wavelength(s). The system may then subtract the baseline reflectance data from the reflected response data for each individual plant. The system may then utilize the resulting reflectance data to determine a health, age, or other status condition of the plant.

In some implementations, the system may also utilize a model, such as a three-dimensional model of expected plant growth based on the planting column and expected rotation of the planting column to assist a user in selecting a position or receptacle in which to place a plant or seed pod. For example, the system may suggest a receptacle for a specific type of plant based on past or historic performance or growth data, rotational data associated with the planting column, known lighting conditions associated with the enclosure, and the like. In one example, the system may capture sensor and/or image data of the planting column and plants associated therewith to determine plant growth rates, estimated yields, detect health issues (such as wilting) and the like. The system may also generate a model, such as a three-dimensional model, of the planting column and the receptacles. The model may be used to determine an optimal position at which particular types of plants have better results. In some cases, the model may be specific to each enclosure while in other cases the model may be generic over a plurality of enclosures and generated based on aggregated sensor data.

In some cases, the model may be integrated or accessible via the associated application hosted on a personal electronic device in wireless communication with the enclosure and/or a cloud-based service. The application may allow the personal electronic device to display a 3D model of the currently inserted plants over time, such as from a current state to a future state. In some cases, the model may be rotatable such as about the planting column, such as via a swipe or other touch based gesture.

FIGS. 1-5 illustrate example views of an enclosure 100 for providing a controlled growing environment according to some implementations. The enclosure 100 may be configured as a plant growing apparatus that provides a climate-controlled interior that houses at least one plant housing assembly or planting column 108. However, unlike conventional home garden systems that provide uniform lighting and temperature, the enclosure 100 may provide active monitoring and adaptive environmental conditions based on the health, stage of growth, type or species of plants, and the like via one or more systems either internal to the enclosure 100, co-located within an physical environment, such as the home 114, or a remote cloud-based systems 116.

In some specific implementations, the enclosure 100 may be configured to monitor individual plants within the growing environment and to provide tailored growing conditions, such as custom lighting (e.g., length of exposure, focal length, temperature, specific wavelengths, intensity, amount, and the like). For example, the enclosure 100 may include one or more illuminators 102 (or light sources) associated with or position with respect to one or more lighting and control columns 104.

In some implementations, the lighting and control column (or panel) 104 may be configured within the enclosure 100 or along a specific region of the enclosure 100. The lighting and control column 104 may be equipped with various sensors 106 for monitoring the individual plants in addition to the one or more illuminators 102. For example, the lighting and control column 104 may be equipped with one or more sensors 106, such as image devices (e.g., red-green-blue image devices, infrared image devices, monochrome image devices, lidar devices, and the like), humidity sensors, temperature sensors, air pressure sensors, air quality/particulate sensors, gas sensors, carbon dioxide ($CO_2$) sensors, spectral sensors, and the like to generate sensor data 118 associated with the interior of the enclosure 100.

As discussed above, the lighting and control column 104 may also be equipped with one or more illuminators 102 (such as visible lights, infrared illuminators, ultraviolet lights, and the like). The illuminators 102 may be adjustable to provide specific spectrums, amounts of light, and intensities of light to each individual planting receptacle based on the corresponding plant's health, life stage, size, and type or species.

In some cases, the lighting and control column 104 may also include multiple rows or columns of sensors 106 and/or illuminators 102. For example, the lighting control column 104 may include an upper row (or column) of sensors 106 and/or illuminators 102, a middle row (or column) of sensors 106 and/or illuminators 102, and a bottom row (or column) of sensors 106 and/or illuminators 102. In other cases, the lighting and control column 104 may include a row or column of sensors 106 and/or illuminators 104 for each corresponding row or column of plants.

In some implementations, a field of view or a region of interest associated with each of the sensors 106 and/or illuminators 102 may be adjustable such that a single sensor 106 and/or illuminator 102 may, respectively, capture data and provide light to multiple planting locations or receptacles while maintaining individual per plant spectrum, amount, and intensity characteristics. For example, the individual growing conditions (e.g., health, size, stage of life, species, and the like) may be detected or determined per plant.

For instance, the enclosure 100 may include a planting column or tower 108 within the enclosure 100. The planting column 108 may comprise a plurality of receptacles, generally indicated by 110, configured to receive individual plants. The planting receptacles 110 may be arranged both in vertical columns and horizontal rows about the planting column 108. For instance, in one specific example, the planting column 110 may include twenty columns and five rows of planting receptacles. In some cases, the planting receptacles 110 may be staggered between the columns, such at each column has one planting receptacle for every other row. In these cases, staggering the planting receptacles 110 allows the enclosure 100 to be able to monitor each individual plant as well as allowing each individual plant sufficient room to grow.

In some cases, the planting column 108 may be rotatable three-hundred and sixty degrees within the enclosure 100 and about a base, or any other limited rotation. For example, a drive motor may be configured to mechanically or magnetically rotate the planting column 110 within the enclosure 100 based on one or more control signals or setting data 120, such as, in some examples, from the system 116 (or, in other examples, via internal control system of the enclosure 100). In some instances, as the planting column 108 rotates, each individual planting receptacle 110 may be assigned a unique identifier, such that the enclosure 100 is able to track each plant based on a determined location within the planting column 108. The planting column 108 could then rotate a planting receptacle 110 toward the door 112 for user access.

In these instances, the lighting and control column 104 may capture sensor data 118 usable to determine the assigned location of a plant upon insertion or planting within a specific planting receptacle 110. For example, a planting receptacle 110 may have a visible marking or invisible marking (e.g., an infrared spectrum mark) that the lighting and control column 104 may capture data 118 usable to determine an insertion of a planting pod into a receptacle 110 and the corresponding receptacle identifier and/or location on the planting column 108. In other cases, the captured sensor data 118 may be usable to determine that a receptacle 110 has been filled as the planting column 108 rotates. In some cases, markings for location determination may also be placed at various positions about the interior surfaces of the enclosure 100 and/or the top and bottom of the planting column 108 to assist with initialization or location determination upon restart or reboot of the enclosure 100 as well as in response to an upgrade or replacement lighting and control column being installed or calibrated.

In some implementations, in addition to the sensors 106 and/or illuminators 102 of the lighting and control column 108, sensors, illuminators, and the like may be positioned above the planting column 108, such that the sensors have an aerial view of the planting column 108. In one example, the sensors 106 may include one or more image capture devices positioned over or on top of the growing chamber facing downwards with a field of view of a front region of the planting column or tower 108, such as would be visible to a user opening the door 112 of the enclosure 100. In another example, the overhead sensors 106 may include multiple sensor types or instances positioned about the top surface of the enclosure 100, such as in each corner, corresponding to each side wall, and the like. In this example, the combination of sensors 106 may provide a top down view of the enclosure 100 as well as a 360 degree view of the planting column 108 including the front view.

In some cases, the overhead sensors 106 may be used to track and/or monitor the planting, pruning, harvesting, cleaning, and assembly of the seed pods, growth rings, and any other component, life stage, maintenance, or consumable associated with the enclosure 100. The sensor data 118 (e.g., image data and the like) may also be used to assist or guide the user experience of farming with the enclosure 100. This experience may include an onboard touch glass interface (such as incorporated into the door 112 of the enclosure 100), mobile application (accessible via a remote mobile device), audible commands, or any other type of machine to human interface.

As an illustrative example, if a user plants a basil plant in the top ring section or row of the planting column 108. The basil may, as a tall growing plant, impact the top of the growing enclosure 100. In this example, if the system 116 associated with the enclosure 100 (e.g., an on board or cloud-based system) may detect within the sensor data 118 that the basil seed pod has been placed outside of a defined recommended planting region with respect to the plating column 108, the system 116 may notify the user via the mobile application. The notification may include planting instructions to relocate the basil seed pod to another lower receptacle 110 within a recommended region. In this manner, the system may include many different recommended regions associated with the planting column 108. Each of the recommended regions may correspond to a different type or species of plant.

In other cases, the system 116 associated with the enclosure 100 may determine an amount of light that is appropriate for a particular plant by determining from the sensor data 118 an amount of reflection associated with, for instance, the leaves of a plant within one or more wavelengths (such as the infrared spectrum). The system may then adjust the amount, spectrum, and intensity of the light such that the leaves are absorbing within a threshold amount of 100% of the light being provided. In this manner, the plant does not receive excess light and the system 116 reduces overall power consumption when compared with conventional indoor grow enclosures.

In some implementations, the system 116 may also be configured to provide data, analytics, and notifications/alerts to the owner or user of the system 116. For example, the system 116 may be in wireless communication with a network 120 or user device 122 associated with a user 124. The system 116 may analyze the captured sensor data 118 with respect to each individual plant to determine a life stage and health associated therewith. In some cases, the system 116 may provide a progress report, such as a growth scorecard, on a periodic basis (e.g., daily, weekly, monthly, etc.) that may be presented to the user 124 via the user device 122 and/or, for instance, an associated application hosted by the user device 122. In some instances, the periodic basis may be defined by the user 124, determined based on the type and species of plants within the enclosure 100, an age or life stage of the plants within the enclosure 100, a number of plants within the enclosure 100, and/or a combination thereof.

In some instances, the system 116 may also determine if there are any concerns or issues with the health and well-being of a plant. For example, the system 116 may detect wilting, unusual reflections, reduced absorption, drooping and the like associated with the plant, the system 116 may generate a notification 126 or alert 128 for the user device 122 so that the user 124 may inspect or intervene in the health of the plant. For instance, if a plant has become sick or harmful insects were introduced, the user 124 may remove the plant and/or the entire planting column to reduce long term damage to the overall crop output of the enclosure 100.

In some implementations, the system 116 may also provide a harvest alert to the user 124 for each individual plant. For instance, the system 116 may determine based on the sensor data 118 that a plant has reached between 90 and 95 present of its maximum growth and should be harvested to improve overall yields of the enclosure 100 and to optimize taste (e.g., prevent bitterness that may occur when the plant starts to decay or stress). In some instances, the harvest thresholds (e.g., size, life stage, growth potential, taste, and the like) may be selected by the system 116 based at least in part on a user input, such as the type of preparation (e.g., salad, cooked, dried, and the like) the user plans for the particular plant or plants. For instance, earlier harvesting of plants may improve taste when the plant is eaten raw, while later harvesting may increase yields, which may be preferred when the plant is being cooked.

In some cases, the enclosure 100 or the cloud-based service 116 associated with and in communication with the enclosure 100 may be configured to generate health, harvest, and taste thresholds for the growth of individual species and types of plants based on past yield and harvest conditions of the enclosure 100, of past yield and harvest conditions of other enclosures 100, various user inputs (such as answers to user surveys or notifications, user harvest preferences, user's meal preparation preferences, and the like). For example, the system 116 may input the sensor data 118 and/or user preferences and habits into one or more machine learned model that may output various conditions and thresholds associated with the system, such as notification or alert thresholds, plant health thresholds, lighting control thresholds, harvest thresholds, and the like. In some cases, the system 116 may also provide discard alerts 128 or warnings, such as when a plant is unhealthy or infected in a manner that risks the reminder of the harvest, or when there is an unexpected slow growth rate (e.g., a growth rate less than a threshold amount based on the type or species, age, etc. of the particular plant).

In some specific examples, the enclosure 100 or the cloud-based service 116 may determine from the sensor data 118 an estimated yield of the harvest for the user 124. The estimated yields may include a range and/or different yield amounts based on usage and/or harvest times. In some cases, the estimated yields may include data associated with different amounts based on the taste preferences of the user (such as higher yields for longer growth periods but increased bitterness in greens and the like).

In one specific example, the system 116 may also use machine learned models to perform object detection and classification on the plants. For instance, the one or more neural networks may generate any number of learned inferences or heads. In some cases, the neural network may be a trained network architecture that is end-to-end. In one example, the machine learned models may include segmenting and/or classifying extracted deep convolutional features of the sensor data into semantic data (e.g., rigidity, light absorption, color, health, life stage, etc.). In some cases, appropriate truth outputs of the model in the form semantic per-pixel classifications (e.g., foliage, stem, fruit, vegetable, bug, decay, etc.).

In some cases, planting pods may be marked with a visible or invisible spectrum (e.g., infrared spectrum) that the sensors 106 may read upon insertion of a pod into a planting receptacle. The marking may indicate a type or species of plant associated with the planting pod as well as other information, such as an age of the pod and the like. In other cases, the planting receptacles of the planting column may include an electrical or magnetic coupling such that the system 116 is able to detect an insertion and determine the information associated with the pod upon insertion.

In some examples, the cloud-based system 116 configured to receive and aggregate data associated with multiple enclosures 100. In some cases, the cloud-based system 116 may process the data associated with the plants received from each of the multiple enclosures 100 in order to determine adjustments to intrinsic parameters or setting data 130 of the various sensors 106 and internal components of the enclosure 100. For example, the cloud-based system may apply one or more machine learned models, as discussed above and below, to determine parameters and/or setting data 130 associated with the internal components (e.g., water delivery system, nutrition delivery system, light systems, rotation systems, and the like) of the enclosure 100 that may be adjusted in future models or units of the enclosure 100. For example, the cloud-based system 116 may input the captured sensor data 118 into a machine learned model and the model may output adaptations for use in lens, focus, shutters, and the like of the sensors. The cloud-based system 116 may also output settings or adjustable characteristics (such as lighting parameters, humidity or moisture parameters, dynamic sensor settings, and the like) which may be downloaded or applied to one or more of active enclosures 100 based on specific user inputs, performance history of the specific enclosure 100, exterior sensor data (e.g., temperature or lighting conditions of the home 114 and the like).

In one specific example, upon initialization or installation of a planting column 108 and/or a lighting and control column 104, the enclosure 100 or a system associated with the enclosure 100 may perform an initialization process. For example, the sensor system may capture a set of images or frames of sensor data. The system may detect markers within the field of view of the sensor systems based at least in part on the set of images. In this example, each detected marker may indicate a location of the capturing sensor (e.g., a three-dimensional position and rotation) relative to the frame of the enclosure or, for instance, a base 122 of the planting column 108. The system may then perform an error minimization technique (e.g., a least squares technique) based at least in part on a known model of the enclosure and the sensor location to determine a sensor position relative to the frame and to the planting column 108. The system may then compose the sensor position relative to the frame and the sensor position relative to the planting column 108 to determine a final position of the sensor relative to the frame and the planting column 108.

The system 116 may then determine the position of the sensor 106 relative to the individual planting receptacles 110 based on the final position of each individual sensor 106 relative to the frame and the planting column 108 and a known model of the planting column 108. In some cases, the enclosure 100 or system 116 may select the model of the planting column 108 based on the sensor data captured and a set of known characteristics of the potential planting columns 108 present in the enclosure 100. For instance, if multiple planting column 108 designs are available, the system 116 may determine the type and/or class as well as a number of planting columns 108 present in the enclosure 100.

In some cases, the system 116 may also determine the position of one or more illuminator 102 or emitter with relative to each individual planting receptacle 110 by composing the position of the sensor 106 and/or illuminator 102 relative to the individual planting receptacles 110 and a known transform (such as a six-degree of freedom transform) between the position of the sensor 106 and the position of the illuminator 102. In this manner, the system 116 may then direct or provide individualized lighting characteristics to each of the individual plants within each individual planting receptacle 110.

In some specific examples, the system 116 may identify individual plants within the planting column 108 using sensor data (such as image data) generated by the sensors 106 of the lighting and control column 104. For instance, the system 116 may capture one or more images or frames of the planting column 108. The system 116 may then determine a position of each of the individual plants relative to a known position of the individual sensor 106. For instance, the system may project the plant's position or location into the sensor 106 frame using geometric calculations. The system 116 may then select a region of interest or determine a bounding box associated with the position of an individual plant based at least in part on the frame. The system 116 may label pixels in the region of interest using a semantic segmentation and/or classification technique. For example, the system 116 may input the sensor data 118 within the region of interest into a machine learned model and receive a plant type or species, age, health, etc. as an output from the machine learned model. The system 116 may then assign the data outputs of the machine learned model to each pixel of the region of interest, such as metadata to the sensor data 118.

In other specific examples, the system 116 may be configured to disengage or turn off any lights or illuminators 102 within the enclosure 100. In this manner, the system 116 may reduce the ambient light associated with the enclosure 100. In some cases, the system 116 may be configured to perform the following operations at specific times of day (such as at night) to further reduce the ambient light within the enclosure 100. In other cases, the system 116 may cause a door 112 window covering to close, tint, or otherwise shade the interior of the enclosure 100. The system 116 may engage or activate a spectral sensor and a desired illuminator or emitter (such as an infrared illuminator).

The system 116 may also cause the planting column 108 to rotate while the sensor 106 and illuminator 102 are engaged to generate sensor data 118 associated with the entire surface of the planting column 108 (e.g., via the provided settings data 130). The system 116 may perform segmentation and/or classification on the sensor data for each planting receptacle 110. In some cases, based on the output of the segmentation and/or classification networks, the system 116 may determine a position of a plant associated with each planting receptacle 110 that maximizes the pixels corresponding to each individual plant. In some cases, the system 116 may utilize a sliding window representation of the illuminator or emitters field of view over the segmented and/or classified image data. The system 116 may then determine a number of pixels for each plant within each planting receptacle 110. At any step of the example process, the system 116 may cause the illuminator or emitter 102 to disengage (e.g. turn off) and the spectral sensor to capture baseline reflectance data associated with one or more of the individual plants (e.g., via the setting data 130).

In the current example specific examples, the system 116 may then cause the illuminator or emitter 102 to articulate or arrange such that the field of view of the illuminator or emitter 102 is associated with the pixels determined above. The illuminator or emitter 102 may then be engaged (or re-engaged) for a desired period of time (e.g., a period of time selected based on the type, age, health, etc. of the associated plant) and at a desired spectrum(s) or wavelength(s) (e.g., near infrared, infrared, ultraviolet, visible, and the like). A sensor 106, such as a spectral sensor, may during the period of time capture additional sensor and/or image data associated with the plant. The system 116 may then determine reflected response data at the various spectrum(s) and/or wavelength(s). The system 116 may then subtract the baseline reflectance data from the reflected response data for each individual plant. The system 116 may then utilize the resulting reflectance data to determine a health, age, or other status condition of the plant.

In some implementations, the system 116 may also utilize a model, such as a three-dimensional model of expected plant growth based on the planting column and expected rotation of the planting column 108 to assist a user in selecting a position or receptacle in which to place a plant or seed pod. For example, the system may suggest a 110 for a specific type of plant based on past or historic performance or growth data, rotational data associated with the planting column 108, known lighting conditions associated with the enclosure 100, and the like. In one example, the system 116 may capture sensor and/or image data of the planting column 108 and plants associated therewith to determine plant growth rates, estimated yields, detect health issues (such as wilting) and the like. The system 116 may also generate a model, such as a three-dimensional model, of the planting column 108 and the receptacles 110. The model may be used to determine optimal or position at which particular types of plants have better results. In some cases, the model may be specific to each enclosure 100 while in other cases the model may be generic over a plurality of enclosures 100 and generated based on aggregated sensor data 118.

In some cases, the model may be integrated or accessible via the associated application hosted on a user device 122 in wireless communication with the enclosure 100 and/or a cloud-based service 116. The application may allow the user device 122 to display a 3D model of the currently inserted plants over time, such as from a current state to a future state. In some cases, the model may be rotatable such as about the planting column 108, such as via a swipe or other touch based gesture.

Figure 6:
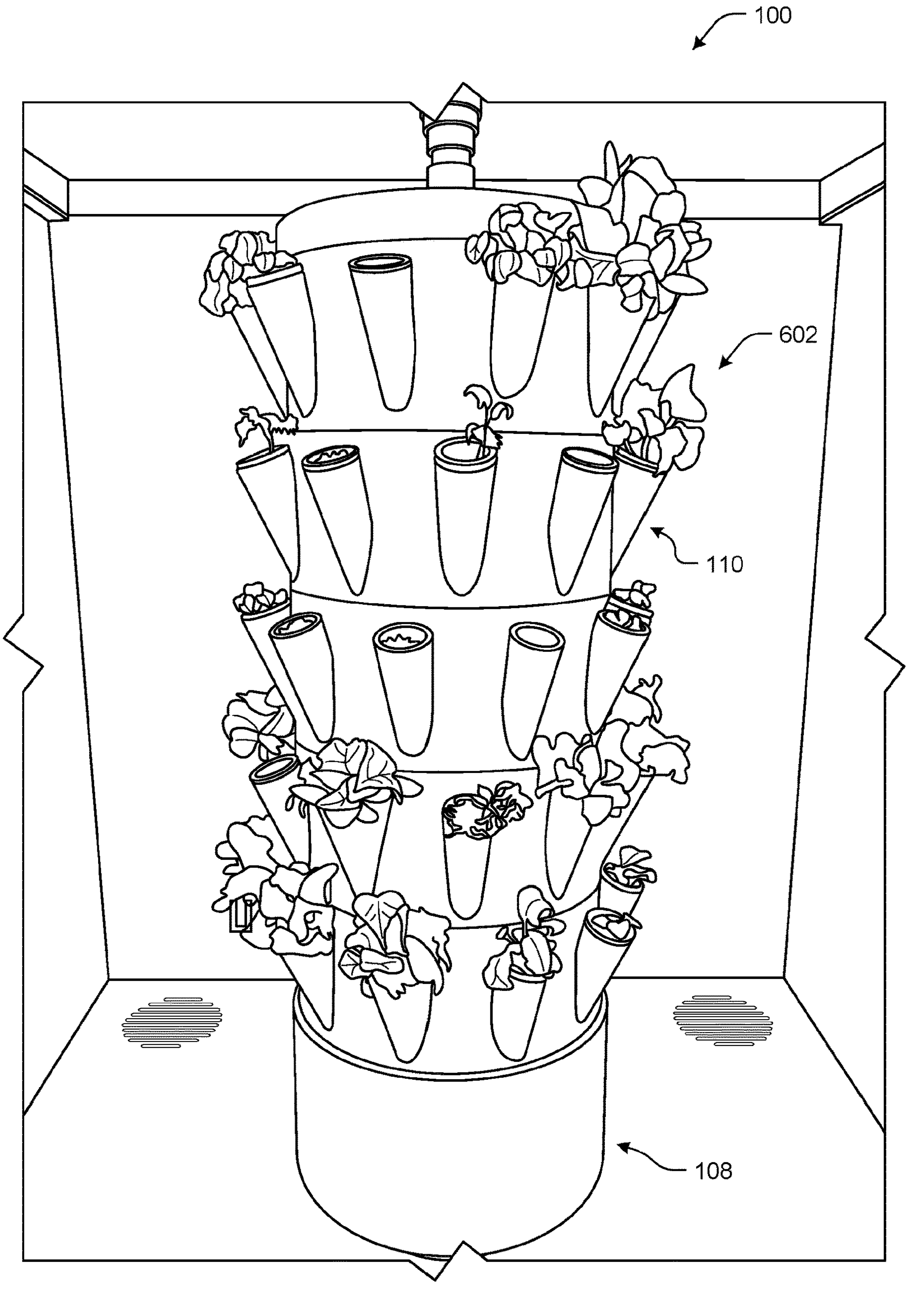
FIG. 6 illustrates an example front view of a planting column associated with the enclosure according to some implementations.

FIG. 6 illustrates an example front view 600 of a planting column 108 associated with the enclosure 100 according to some implementations. In the illustrated example, the planting column 108 may comprise a plurality of receptacles 110 configured to receive individual plants, generally indicated by 602. The planting receptacles 110 may be arranged both in vertical columns and horizontal rows about the planting column 108. For instance, in one specific example, the planting column 108 may include twenty columns and five rows of planting receptacles 110. In some cases, the planting receptacle(s) 110 may be staggered between the columns, such that each column has one planting receptacle 110 for every other row. In these cases, staggering the planting receptacles 110 allows the enclosure to be able to monitor each individual plants 602 as well as allowing each individual plant 602 sufficient room to grow.

In some cases, the planting column 108 may be rotatable three-hundred and sixty degrees within the enclosure and about a base, or any other limited rotation. In some instances, as the planting column 108 rotates, each individual planting receptacle 110 may be assigned a unique identifier, such that a system, such as system 116 of FIGS. 1-5, may track each plant 602 based on a determined location within the planting column 108. In these instances, the system may determine the assigned location of a plant upon insertion or planting within a specific planting receptacle. For example, a planting receptacle 110 may have a visible marking or invisible marking (e.g., an infrared spectrum mark), generally indicated by 604, that the system 116 may read upon insertion of a planting pod or seed cartridge. In other cases, the system 116 may determine that a receptacle 110 has been filled as the planting column 108 rotates. In some cases, markings 604 for location determination may also be placed at various positions about the interior surfaces of the enclosure and/or the top and bottom of the planting column 108 to assist with initialization or location determination upon restart or reboot of the system as well as in response to an upgrade or replacement lighting and control column being installed or calibrated.

Figure 7:
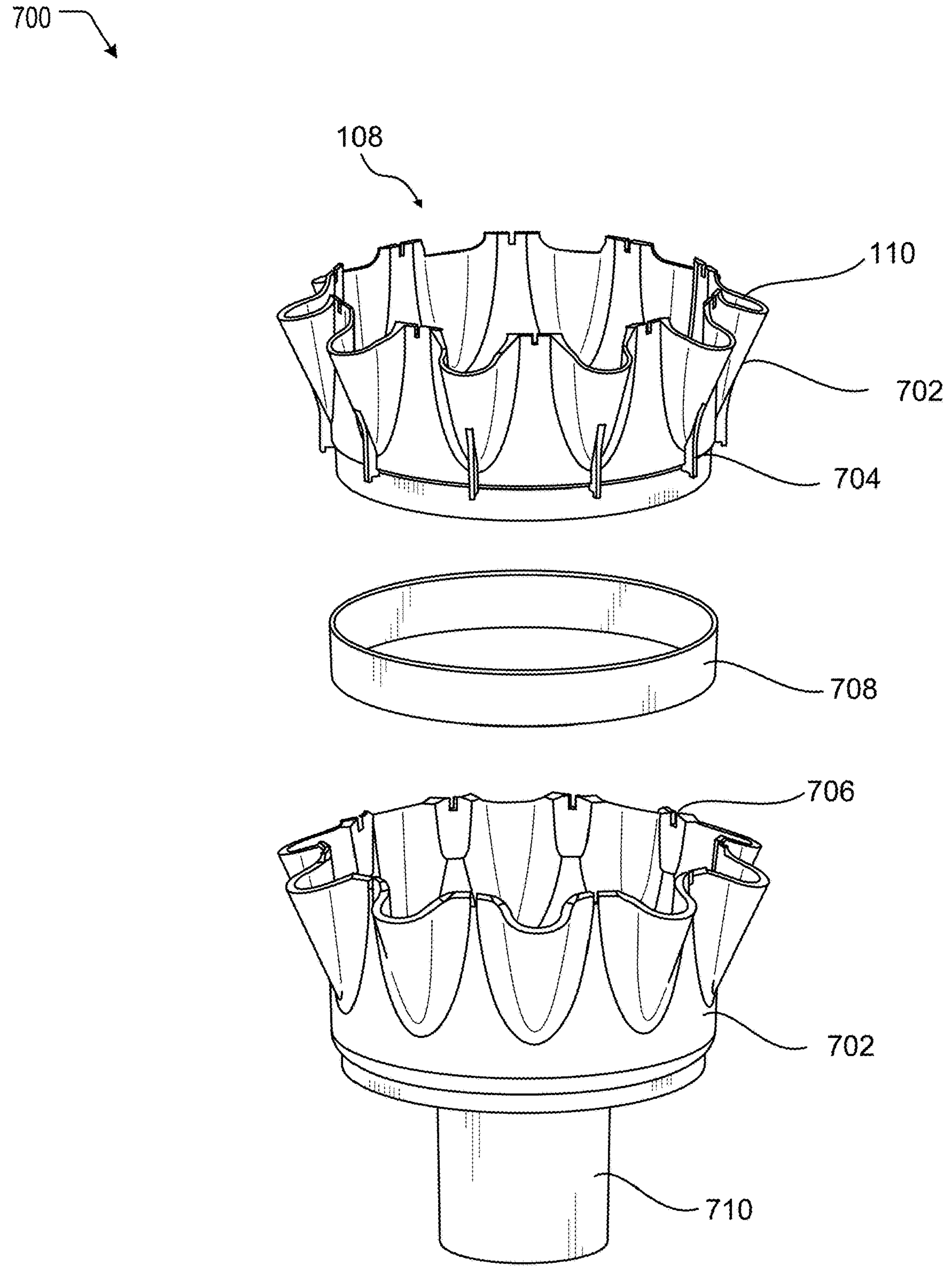
FIG. 7 illustrates an example exploded view of the planting column of the enclosure according to some implementations.

FIG. 7 illustrates an example exploded view 700 of the planting column 108 of the enclosure 100 according to some implementations. In the current example, the planting column may include a plurality of growth rings 702 stacked about each other. Each growth ring 702 may have a plurality of planting receptacles 110 that may be arranged in rows along the growth ring 702. The growth rings 702 may be configured to mate with each other, via locking mechanisms 704 and 706 to allow for sufficient space between receptacles 110 for plant growth. In this manner, the number of growth rings 702 may be tailored for the size of the enclosure. Additionally, the highest of each growth ring 702 may vary to allow for planting of different sized plants and/or insertion of different sized seed pods or cartridges.

In some cases, a gasket 708 may be positioned between each subsequent or stacked growth ring 702 to reduce vibration and movement when the planting column 108 is rotated. The bottom portion or ring may include a drain member 710 extending downward to provide a location for fluid to drain from the interior of the planting column 108 into, for instance, a reservoir positioned below the planting column 108.

Figure 2:
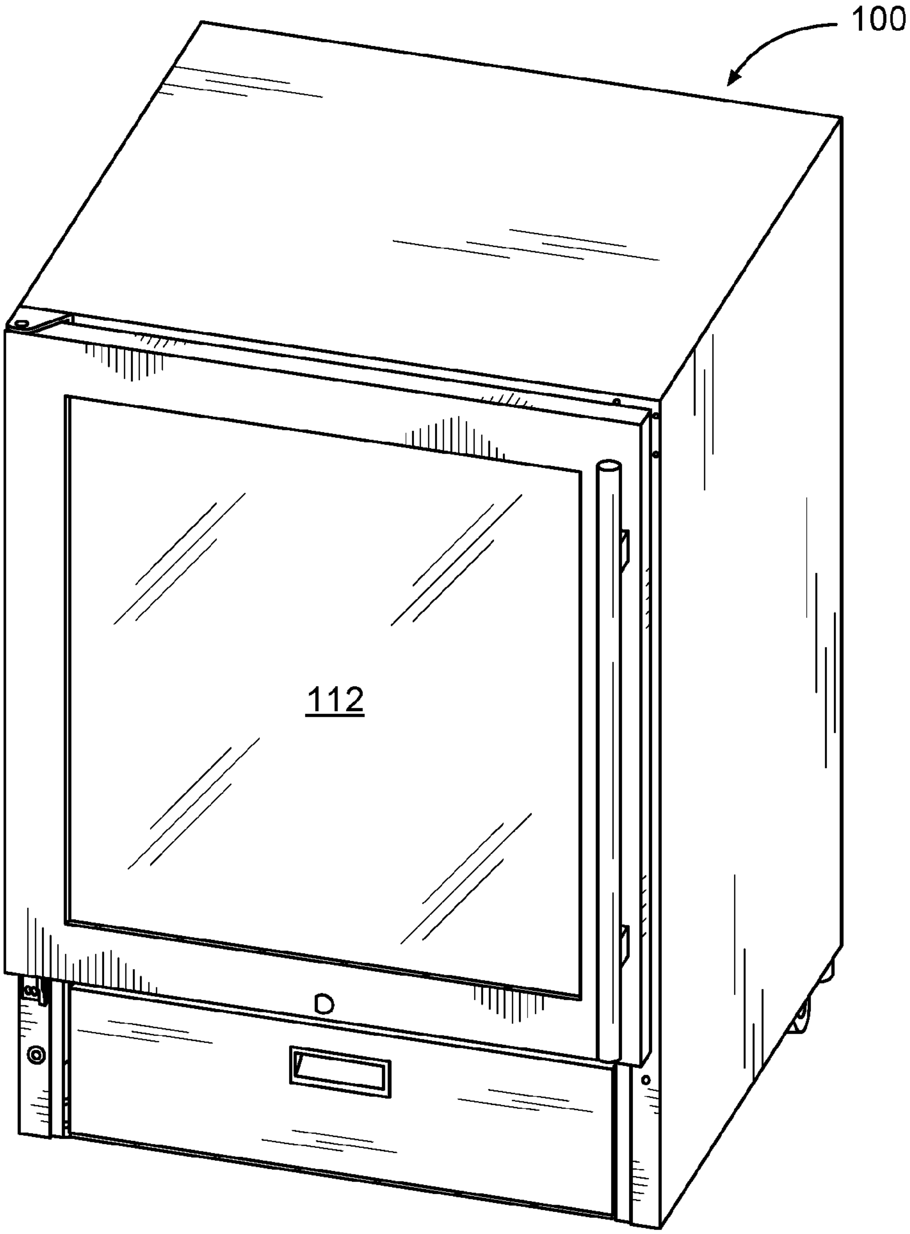
FIG. 2 illustrates an example perspective view of an exterior of the enclosure for providing a controlled growing environment according to some implementations.
Figure 3:
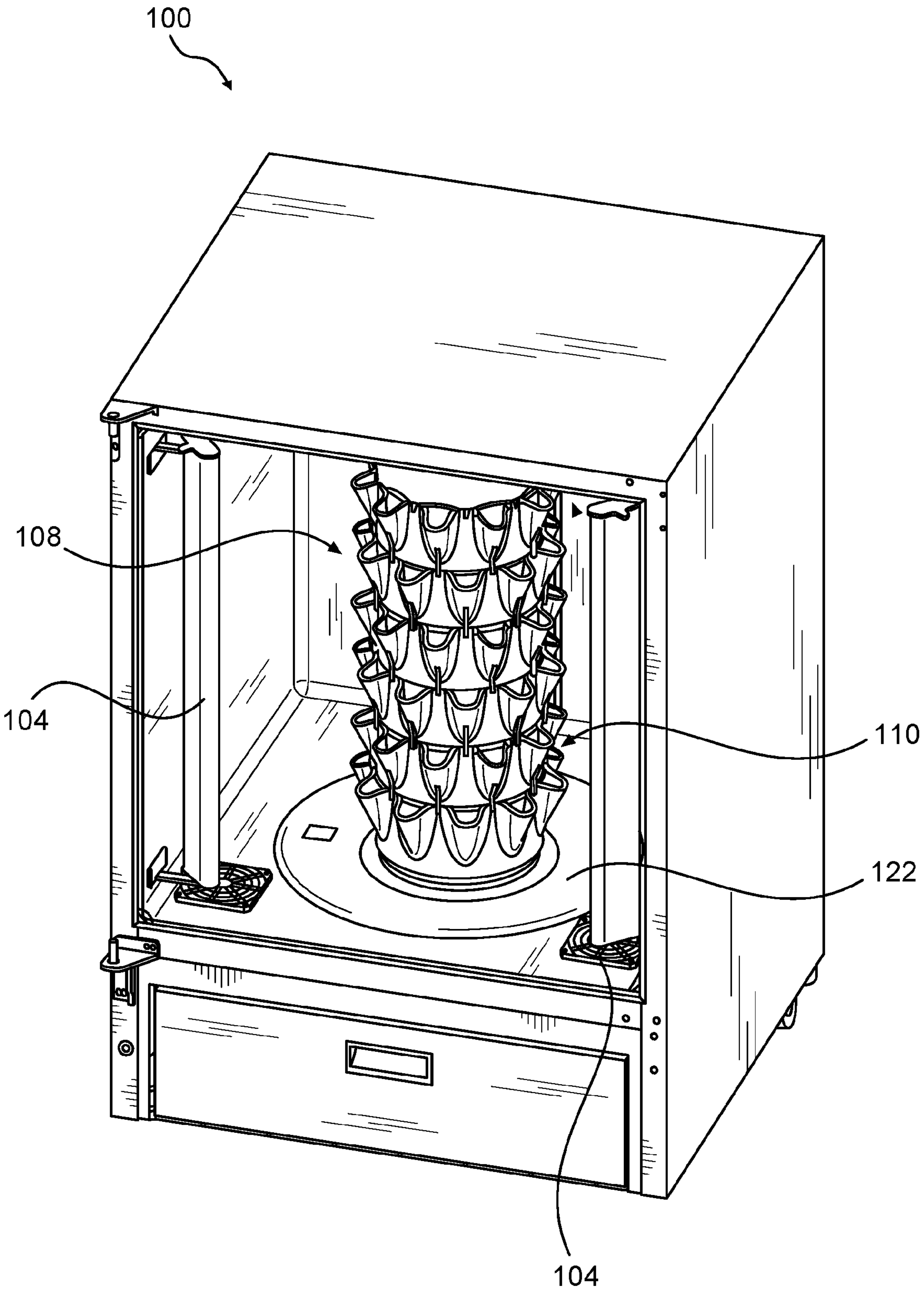
FIG. 3 illustrates an example perspective view of an interior of the enclosure of FIG. 1 according to some implementations.
Figure 4:
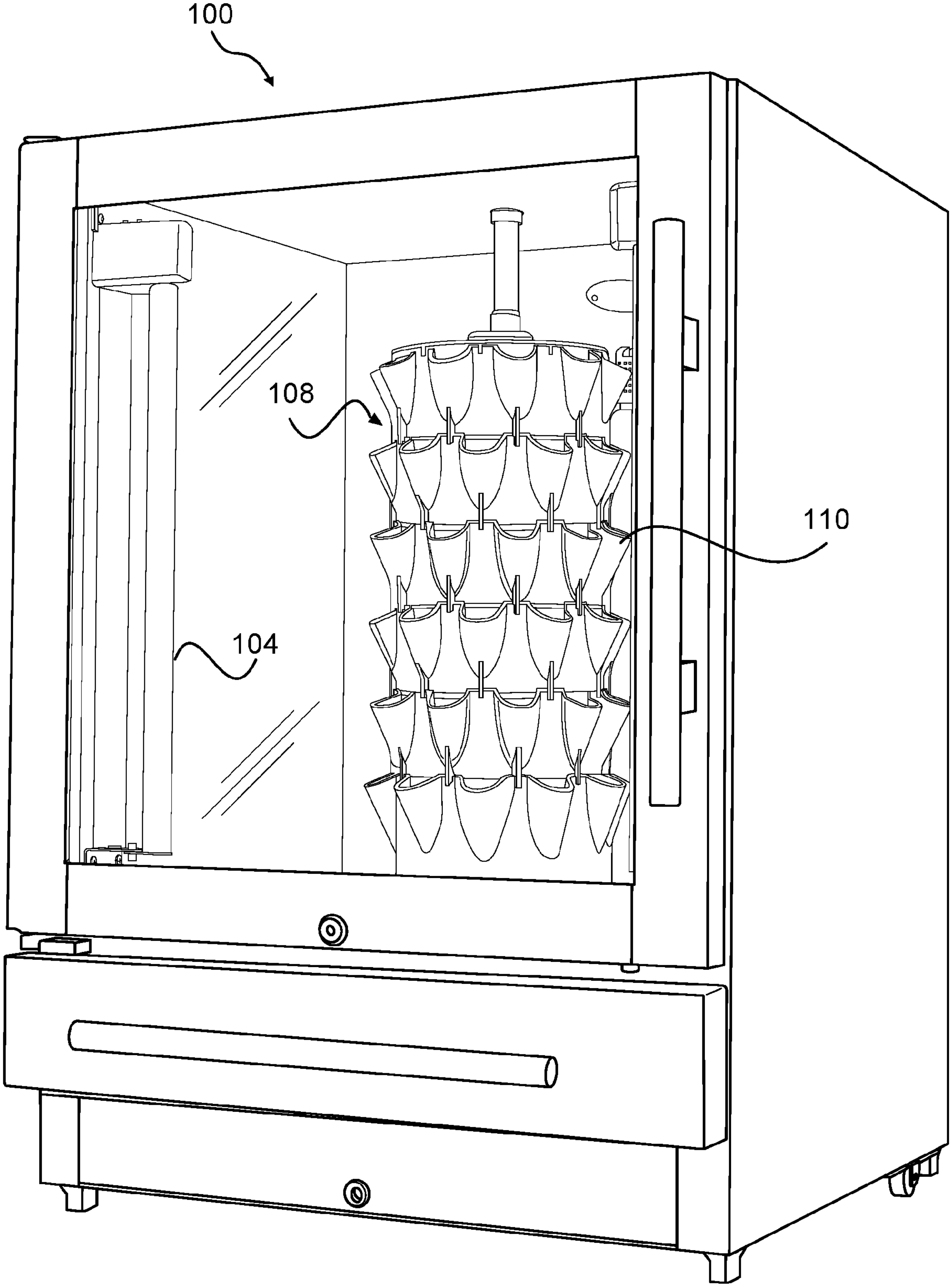
FIG. 4 illustrates another example perspective view of the enclosure of FIGS. 1 and 2 according to some implementations.
Figure 5:
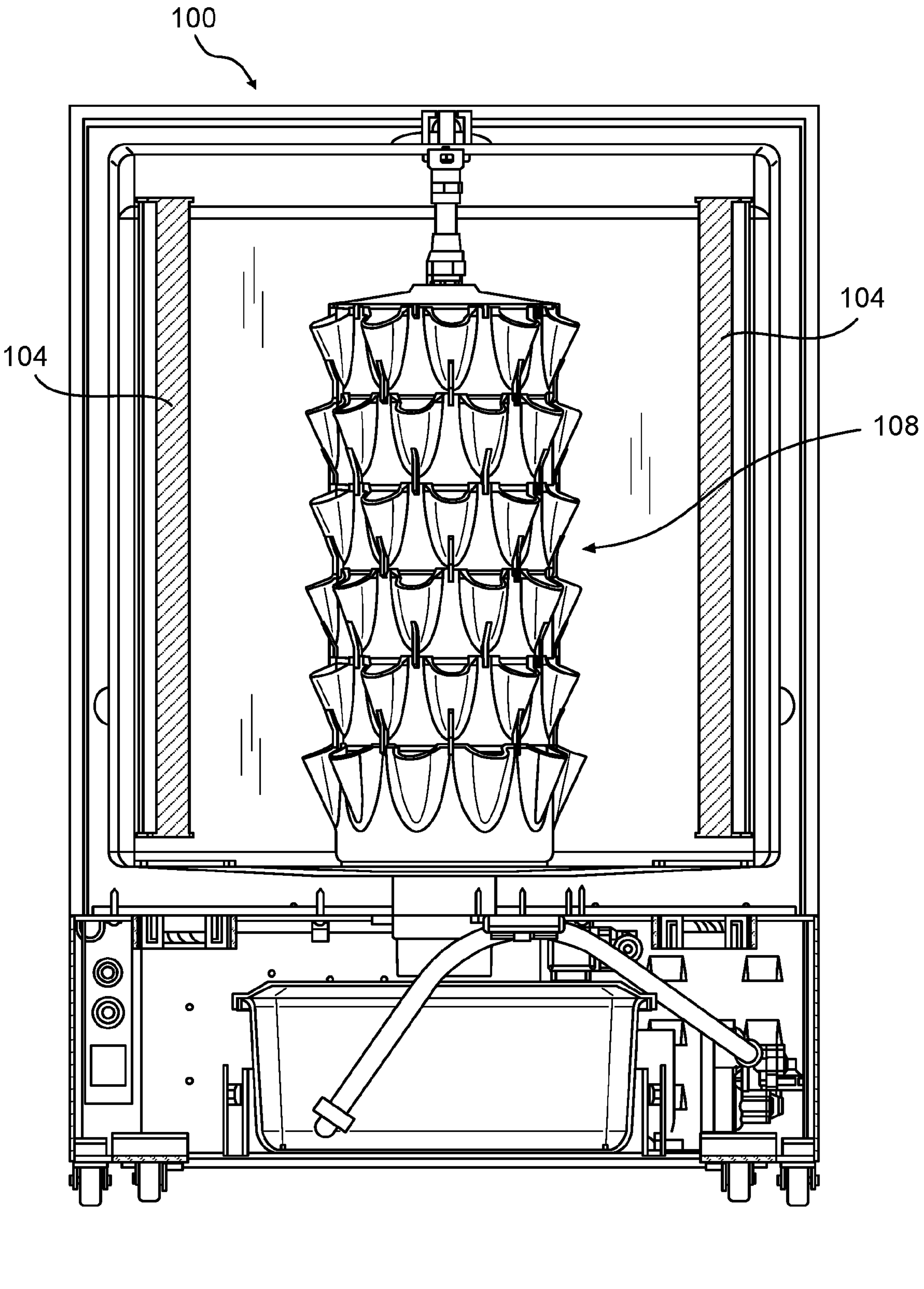
FIG. 5 illustrates an example front view of the enclosure of FIGS. 1 and 2 according to some implementations.
Figure 8:
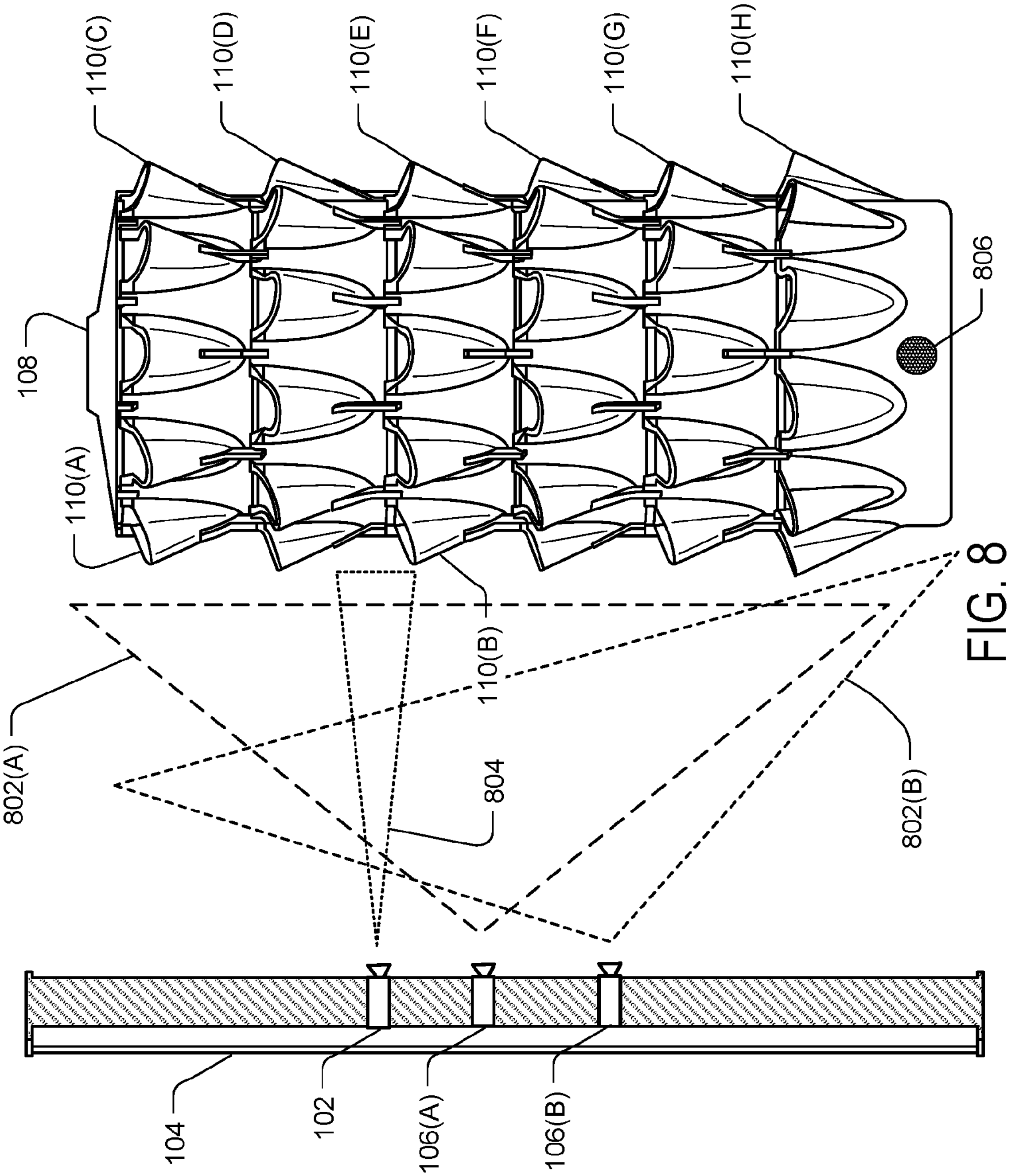
FIG. 8 is an example pictorial view taken from the front of the planting column and a lighting and control column associated with the enclosure of FIGS. 1 and 2 according to some implementations.

FIG. 8 is an example pictorial view 800 taken from the front of the planting column and a lighting and control column 104 associated with the enclosure of FIGS. 1 and 2 according to some implementations. In the illustrated example, the planting column 108 includes a plurality of planting receptacles, generally indicated as planting receptacles 110(A)-(H). Each planting receptacle 110 may be configured to receive a seed cartridge or pod, such as the seed cartridge discussed below with respect to FIG. 12, and the planting receptacles 110 may be arranged such that each receptacle 110 provides space or room above the receptacle 110 for a plant to mature.

In the current example, the lighting and control column 104 may be arranged vertically and include one or more sensors, such as sensors 106(A) and 106(B), as well as one or more illuminators, such as illuminator 102. In this example, the sensor 106(A) may be a spectral sensor and the sensor 106(B) may be an image sensor. Each of the sensors 106 may have a corresponding field of view 802(A) and 802(B) of the planting column 108 as illustrated. Similarly, the illuminator 102 may also have a field of illumination 804. In this example, the field of illumination 804 may be configured to provide directed illumination to a single plant associated with a specific planting receptacle (currently illustrated as planting receptacle 110(B)). In this example, the characteristics of the light being emitted by the illuminator 102 and the position of the field of illumination 804 may be adjustable based on the current target (e.g., planting receptacle 110(B)). For instance, the intensity, wavelength, and type of illumination may vary as the field of illumination 804 is adjusted from the planting receptacle 110(B) as shown to the planting receptacle 110(A), as the planting receptacle 110(B) may have a different vegetation at a different maturity level or life stage and accordingly requiring different lighting for optimal growth.

In the current example, the planting column 108 may also include one or more markers 806 that may be visible to the sensors 106 as the planting column 108 rotates. The marker 806 may assist the system in determining the currently visible planting receptacles 110 and the current position of the planting column 108 as the planting column 108 rotates about its vertical axis. The sensors 106 and/or the illuminator 102 may have a known position along the lighting and control column 108, such that the system may be able to determine the space and/or location within the field of view of the sensors associated with each planting receptacle 110 and thereby each plant. The sensors 106 and the illuminator 102 may also have a known distance and the known distance may be usable to the system to determine adjustments to the field of illumination 804 to correctly target specific plants with specific illumination based on the determined position of the plants, the planting receptacles 110 determined within the field of view of the sensors 106, and the distances between the respective sensors 106 and/or the illuminators 103 and the sensors 106.

In some cases, the system may also utilize the geometry of the enclosure and/or the planting column 108 to determine the position for the field of illumination 804. The system may also utilize a known distance between the sensors 106 and the planting column 108 as well as a known distance between the illuminator 102 and the planting column 108 to assist with adjusting the field of illumination 804. In some cases, the illuminator may include a pan, tilt, zoom feature that may also allow the illuminator 102 to adjust the field of illumination 804 position and size based on the targeted area or location associated with individual plants.

Figure 9:
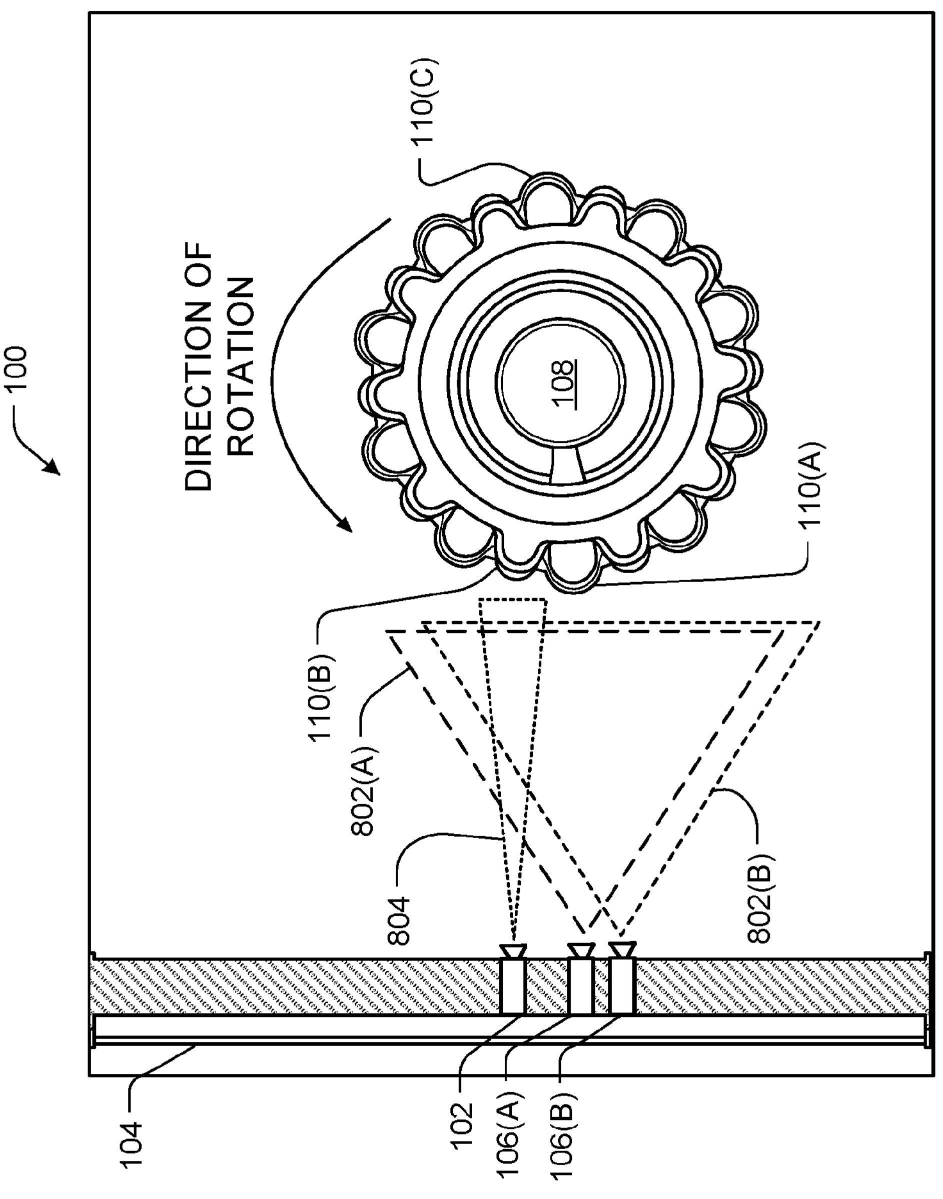
FIG. 9 is an example pictorial view taken from the top of the planting column and lighting and control column associated with the enclosure of FIGS. 1 and 2 according to some implementations.

FIG. 9 is an example pictorial view taken from the top of the planting column 108 and lighting and control column 104 associated with the enclosure of FIGS. 1 and 2 according to some implementations. In this example, the lighting and control column 104 may be configured horizontally within the enclosure 100 and/or the sensors 106 and the illuminators 102 may be offset from each other along a horizontal access in lieu of or in addition to being offset vertically, as shown above with respect to FIG. 8. For instance, the sensors 106 and the illuminator 102 may be offset both vertically and horizontal with respect to each other.

In this example, the system may be able to determine the space and/or location within the field of view 802 of the sensors 106 associated with each planting receptacle 110 and thereby each plant. The sensors 106 and the illuminator 102 may also have a known horizontal distance and the known horizontal distance may be usable to the system to determine adjustments to the field of illumination 804 to correctly target specific plants with specific illumination based on the determined position of the plants, the planting receptacles 110 determined within the field of view of the sensors 106, and the distances between the respective sensors 106 and/or the illuminators 103 and the sensors 106. In some cases, the system may also utilize the geometry of the enclosure and/or the planting column 108 to determine the position for the field of illumination 804.

In some cases, the system may also utilize the sensor data generated by the sensors 106 to determine a type of plant, health of the plant, life stage or maturity of the plant, size of the plant, and the like within each planting receptacle 110. The determined type, health, life stage, size and the like may then be used by the system to select the characteristics (e.g., intensity, wavelengths, field of illumination 802, and the like) of the light provided by the illuminator 102 to each plant.

Figure 10:
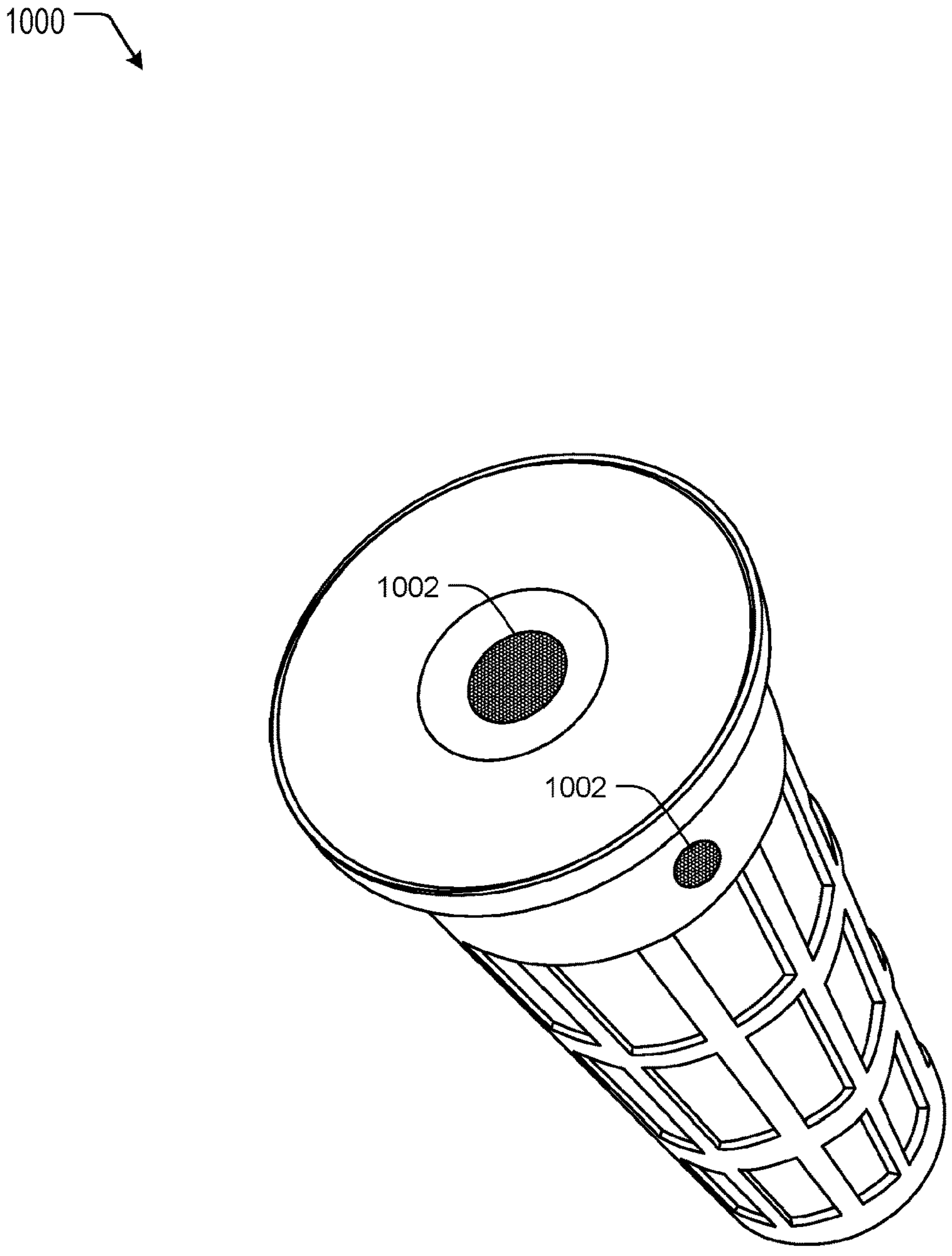
FIG. 10 is an example perspective view of a seed cartridge for use with the planting column associated with the enclosure of FIG. 1 according to some implementations.

FIG. 10 is an example perspective view of a seed cartridge 1000 for use with the planting column associated with the enclosure of FIG. 1 according to some implementations. The seed cartridge 1000 may be configured to fit or mate with the planting receptacles of the planting column. In some cases, the planting cartridge 1000 may include seeds, grow medium, nutrients, growth stimulants, hormones, fungi and the like associated with growing plants in an enclosure environment. In some cases, the planting cartridge 1000 may include one or more markings 1002 that may be represented in sensor data generated by the sensors of the enclosure and utilized by the enclosure and/or the system to determine a type of plant being inserted into the planting column. The type may then be used to customize the illumination (e.g., wavelength, time, intensity, and the like) that is directed to the associated planting receptacle, as discussed above.

Figure 11:
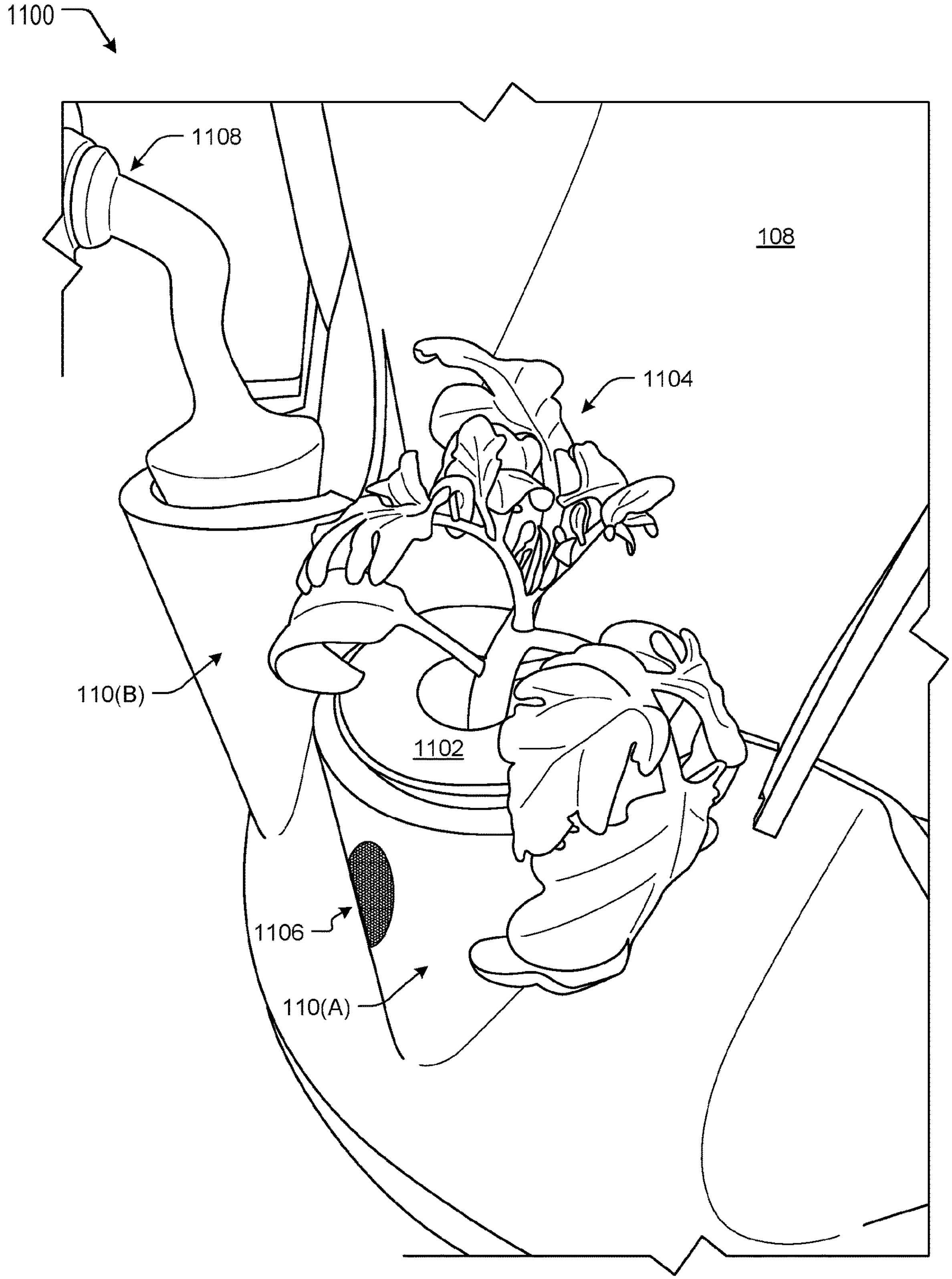
FIG. 11 is an example perspective view of a seed cartridge engaged in a planting receptacle of the planting column associated with the enclosure of FIG. 1 according to some implementations.

FIG. 11 is an example perspective view 1100 of a seed cartridge 1102 engaged in a planting receptacle 110(A) of the planting column 108 associated with the enclosure of FIG. 1 according to some implementations. In this example, a plant 1104 has sprouted into the space above the planting receptacle 110(A) as shown. In this manner, the system may cause customized illumination to be directed at the plant 1104 and/or the location above the planting receptacle 110(A), as discussed above.

In this example, the planting receptacle 110(A) includes a marker or identifier 1106 that may be detected within the sensor data collected by the sensor systems associated with the enclosure. In some cases, the identifiers 1106 may be infrared or invisible to humans to improve the ascetic quality of the planting column 108 and/or the enclosure. The identifier 1106 may be used to determine the location of the plant 1104 with respect to the planting column 108. The current example also includes an artificial plant 1108 inserted into the planting receptacle 110(B). In some implementations, the system may monitor an insertion event associated with the artificial plant 1108 and utilize detections of the artificial plant 1108 within the sensor data generated by the enclosure to determine a location or position of the plant 1104 with respect to the planting column 108. In this manner, the artificial plant 1108 may be used both as a visual indication to a user of the enclosure as well as for the systems associated with the enclosure in determining positions of specific plants with respect to the planting column 108. For example, the user may insert one or more artificial plants 1108 into receptacle 110 and each artificial plant 1108 may be of a different pattern, color, size, flower type, or the like and thereby provide the visual indication to the user and the systems associated with the enclosure. As one illustrated example, the visual indication may include detecting a gasket flap(s) covering the planting receptacle 110 or a motion associated with the gasket flap covering.

In some examples, the system may also detect insertion events via a detection, scanning, and/or imaging of an identifier (e.g., a bar code, a near field communication (NFC) tag, radio-frequency identification (RFID) tag, or the like). For instance, a user may scan the seed cartridge 1102 prior to insertion into the seed receptacle 110(A), as shown. In some cases, the scanning via the user device may initiate a scan by the sensors of the enclosure to determine the location (e.g., the receptacle 110(A)) of the inserted seed cartridge 1102 and/or other events (such as a user preference collection event). In some cases, scanning the seed cartridge 1102 with the user device may allow the system to determine an expected plant type, expected growth features, and the like.

Figure 12:
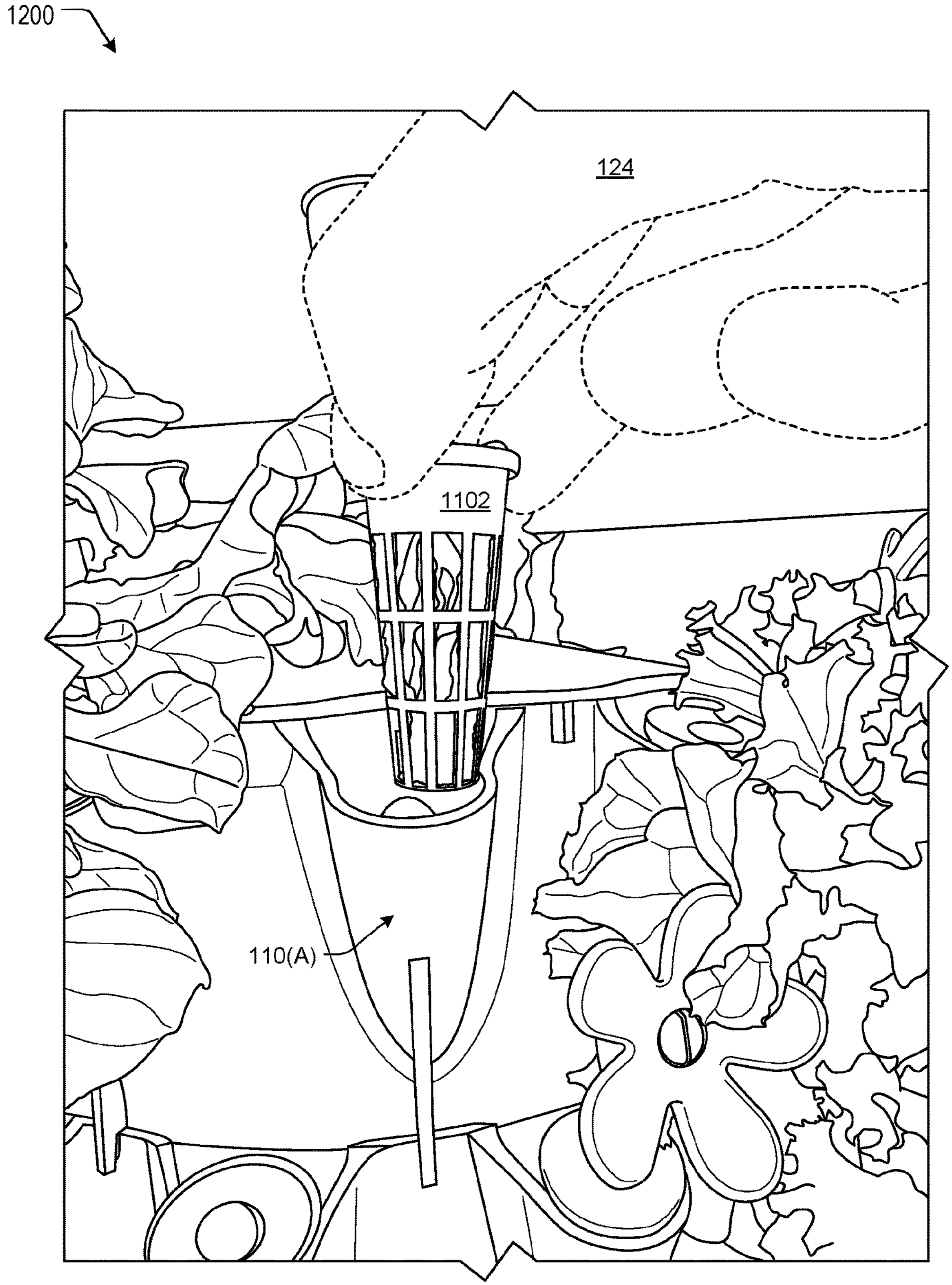
FIG. 12 is an example perspective view of a seed cartridge being inserted into the planting receptacle of a planting column according to some implementations.

FIG. 12 is an example perspective view 1200 of a seed cartridge 1102 being inserted by a user 124 into the planting receptacle 110(A) of a planting column 108 according to some implementations. In this example, the sensor systems of the enclosure may be configured to capture sensor data associated with the insertion event and the enclosure and/or a system associated with the enclosure may be configured to utilize the sensor data representing the insertion event to determine features and/or characteristics of the seed cartridge 1102 (e.g., plant type and the like) as well as the location the seed cartridge has with respect to the planting column 108 (e.g., the seed cartridge 1102 is in the receptacle 110(A)).

FIGS. 13-16 are flow diagrams illustrating example processes associated with the growing enclosure as discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 13:
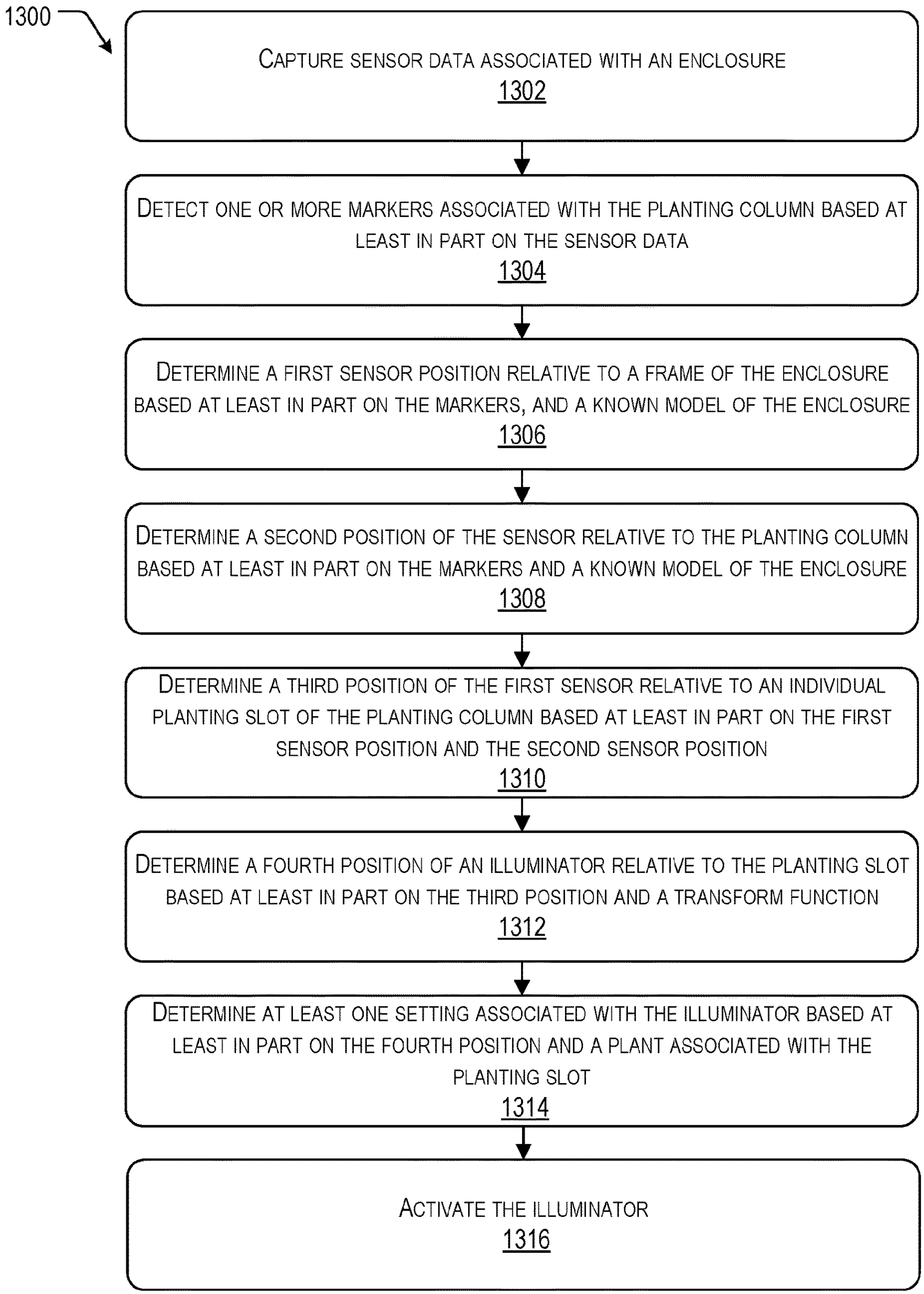
FIG. 13 is an example flow diagram showing an illustrative process for determining settings for the lighting and control system associated with an individual plant according to some implementations.

FIG. 13 is an example flow diagram showing an illustrative process 1300 for determining settings for the lighting and control system associated with an individual plant according to some implementations. As discussed above in some cases, the enclosure and associated systems (e.g., control systems, cloud-based systems, and the like) may be configured to provide customized lighting for each individual plant currently inhabiting the enclosure. The customized lighting may include custom intensities, wavelengths, size, length of time, and the like. The customized settings may be selected, in some examples, based at least in part on determined size, health, life stage, type, maturity, and the like of the plant.

At 1302, a first sensor may capture sensor data associated with an enclosure. In some cases, the first sensor may be an image device, such as red-green-blue image devices, infrared image devices, monochrome image devices, stereo image devices, as well as depth sensors, lidar sensors, and the like. In some cases, the sensor data may include depth data as well as image data in various spectrums.

At 1304, the system may detect one or more markers associated with the planting column (or the enclosure) based at least in part on the sensor data. For example, the marker may be visible or invisible (e.g., within the infrared spectrum) in the human visible spectrum and placed at locations on the planting column and/or on surfaces of the enclosure. In some cases, the markers may be inserted by a user, such as the flower marker discussed above in FIG. 11. In the case of an insertable marker, the system may detect the insertion event and log or store the location or associated planting receptacle together with a model usable to detect the insertable marker in memory. In some cases, if the marker is removed the system may detect the removal event and remove the location and model from memory.

At 1306, the system may determine a first sensor position relative to a frame of the enclosure based at least in part on the markers and a known model of the enclosure. For example, the model of the enclosure may be stored with respect to the enclosure or accessible via a cloud-based service. In some cases, upon initial activation the system may scan the enclosure and select a model to use or a user may select a model.

At 1308, the system may determine a first sensor position relative to a planting column based at least in part on the markers and a known model of the enclosure. For example, the model of the enclosure may include the characteristics of the planting column as well as the enclosure itself. In some cases, the characteristics may vary, such as when the planting column is modular to provide different arrangements of planting receptacles or different distances between rows and columns of planting receptacles. In these cases, the system may periodically ask the user via a mobile application or an interface of the enclosure to confirm the inserted planting column arrangement and/or detect change events associated with the planting column and in response to update the stored enclosure model. In some cases, the users may also initiate an update of the enclosure model via a user input on the enclosure and/or the mobile application.

At 1310, the system may determine a third position of the first sensor relative to an individual planting receptacle of the planting column based at least in part on the first sensor position and the second sensor position. For example, the system may, based at least in part on the image data, determine the planting receptacles visible to the first sensor and then using the first position and the second position determine the position of the first sensor with respect to individual visible planting receptacles.

At 1312, the system may determine a fourth position of an illuminator relative to the planting receptacle based at least in part on the third position and a transform function. The transform function may represent an offset in the X, Y, and/or Z direction between the first sensor and the illuminator. In this example, only the position of a first sensor is used to determine the fourth position between the illuminator and the desired planting receptacle. However, in other cases, the system may utilize additional sensors (e.g., image devices and/or spectral sensors) to determine a position of a second sensor relative to the planting receptacle and then utilizing the second position and a second transform function to confirm the fourth position and ensure the correct plant is receiving illumination at the desired settings.

At 1314, the system may determine at least one setting associated with the illuminator based at least in part on the fourth position and a plant associated with the planting receptacle and, at 1316, the system may activate the illuminator to provide illumination to the desired plant and/or planting receptacle. For example, the field of illumination may be adjusted based on the fourth position such that the field of illumination is relative or directed at the desired planting receptacle. For instance, the illuminator may pan, tilt, and/or zoom the field of illumination to provide customized illumination to the specific plant in the desired planting receptacle. The system may also select settings or characteristics of the light based on the image data captured of the plant. For example, using the image data features of the plant, such as health, presence of decay, size, maturity and the like may be determined. The system may then select settings for the intensity, wave lengths, length of time or exposure, and the like based at least in part on the features.

In some cases, the customized illumination may be configured to provide customized nutrition and/or taste to each individual plant. For example, the user may input via an application hosted on the user device and/or via a user input device on the enclosure user preferences. The user preferences may include desired taste (sweetness, bitterness, and the like), size, nutritional benefits (e.g., desired vitamins, fiber, and the like), and the like. The system may then convert the user preferences into customized illumination (and/or other environmental factors associated with the enclosure and/or individual plants) settings. As an illustrative example, the user preferences with historical data, plant types, specifics, nutritional values, maturity, life stage, and the like may be used to determine customized illumination settings for each plant as the plant matures to encourage the plant to achieve the user preferences.

In some cases, the system may present (either via the application hosted on the user device or via a user interface of the enclosure) options for the user to select in response to detecting an insertion event. For example, the system may detect the insertion of a specific type of seed cartridge. The system may then query the user related to the desired taste, size, preparation styles, dish, nutritional goals, and the like. The system may then utilize the user inputs to further customize the illumination settings (and/or other environmental factors) associated with the plant.

In the current example, the process 1300 is discussed with respect to a planting receptacle but it should be understood that the process 1300 may be configured to determine relative position of a plant in addition to or in lieu of the relative position of the planting receptacle.

Figure 14:
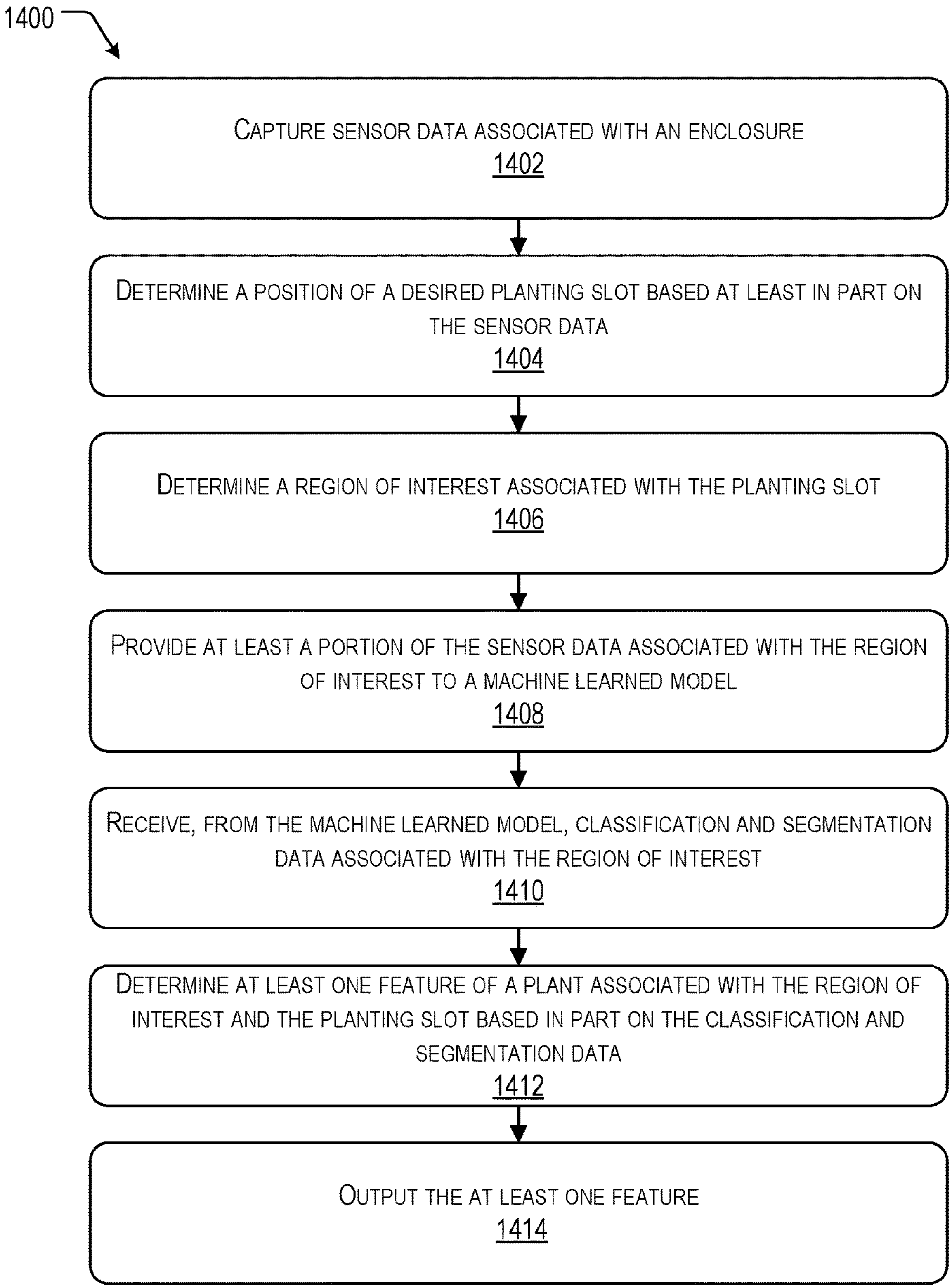
FIG. 14 is another example flow diagram showing an illustrative process for determining a characteristic of an individual plant according to some implementations.

FIG. 14 is another example flow diagram showing an illustrative process 1400 for determining a characteristic of an individual plant according to some implementations. As discussed above, the system may select illumination characteristics or settings based at least in part on the sensor data associated with each individual plant.

At 1402, the system may cause a sensor to capture sensor data associated with an enclosure. In some cases, the first sensor may be an image device, such as red-green-blue image devices, infrared image devices, monochrome image devices, stereo image devices, as well as depth sensors, lidar sensors, and the like. In some cases, the sensor data may include depth data as well as image data in various spectrums.

At 1404, the system may determine a position of a desired planting receptacle (and/or plant) based at least in part on the sensor data. For example, as discussed above with respect to process 1300, the system may determine a relative position between an illuminator and a desired planting receptacle. In other cases, the system may utilize a model of the enclosure and/or the planting column, known distances between the illuminator, sensors, and planting column, and the captured sensor data to determine the position of the desired planting receptacle.

In some cases, the desired planting receptacle may be selected based on a known pattern or based at least in part on plants detected in association with the planting receptacle. For example, the system may partition the sensor data into segments associated with each individual planting receptacle and using the sensor data determine if a plant or seed cartridge is present. The system may then determine a pattern of illumination to provide illumination to each planting receptacle or plant present in the enclosure and visible to the sensors and/or illuminators.

At 1406, the system may determine a region of interest associated with the planting receptacle (and/or plant). For example, the system may determine the region of interest by detecting a plant and determine one or more boundary or bounding box associated with the plant. In some cases, the bounding boxes may be dynamic based on a size of the plant and/or predetermined and associated with individual planting receptacles.

At 1408, the system may provide at least a portion of the sensor data associated with the region of interest to a machine learned model and, at 1410, the system may receive, from the machine learned model, a classification and/or segmentation data associated with the region of interest. Then, at 1412, the system may determine at least one feature of a plant associated with the region of interest and the planting receptacle based at least in part on the classification and segmentation data. For instance, the classification and segmentation data may include boundaries associated with one or more plant(s) within the region of interest as well as a type of plant and/or other features of the plant, such as health, size, maturity, and the like. In some cases, the features may also include decay, presence of insects, mold, or other damage. In some cases, the segmentation data may include overlapping foliage of plants or other indications that one or more neighboring plants are encroaching on the current region of interest.

At 1414, the system may then output at least one feature. For instance, the feature may be output to a system or module that is configured to determine lighting or illumination settings based on the one or more features of the plants and/or the bounders.

Figure 15:
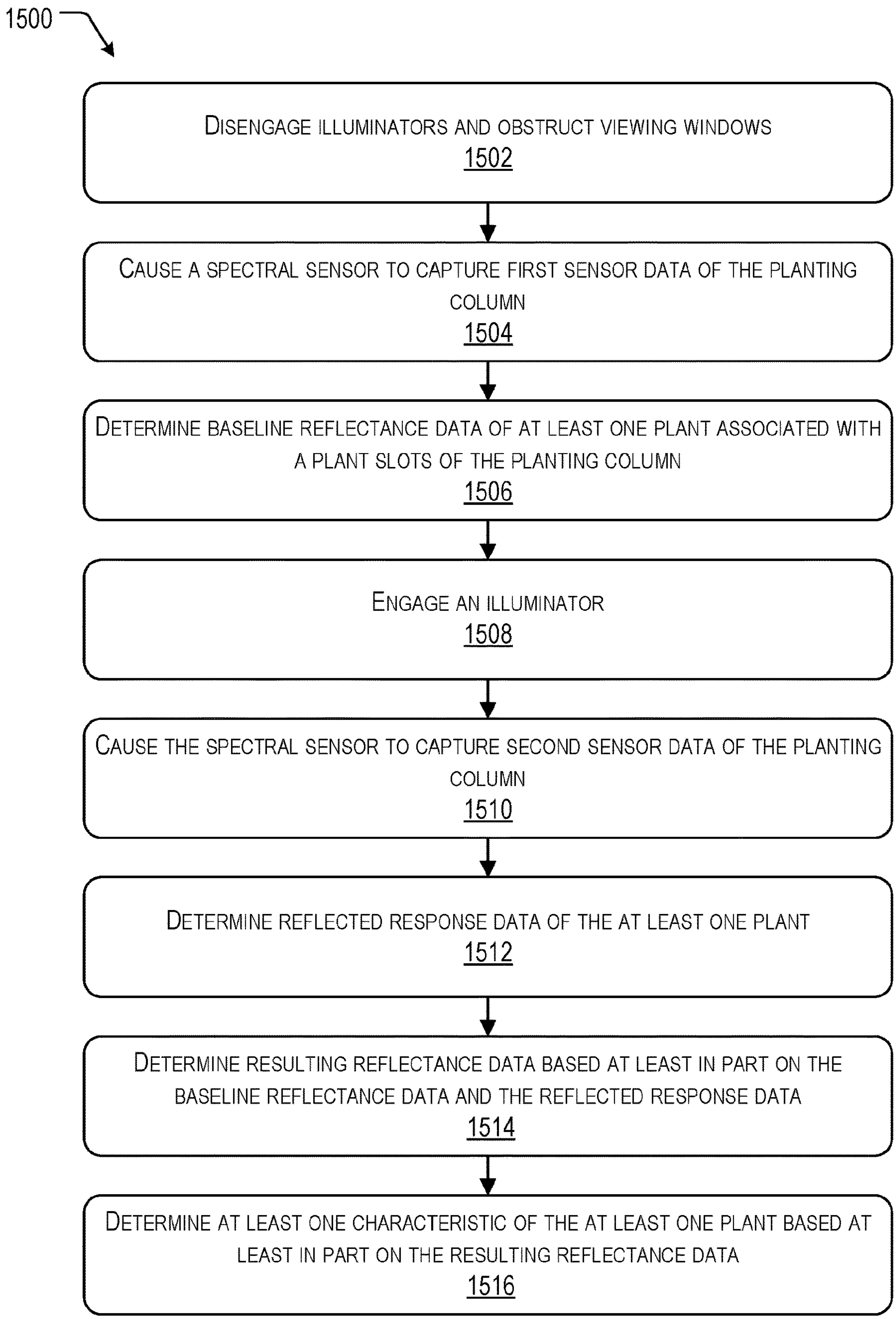
FIG. 15 is another example flow diagram showing an illustrative process for determining a characteristic of an individual plant according to some implementations.

FIG. 15 is another example flow diagram showing an illustrative process 1500 for determining a characteristic of an individual plant according to some implementations. In some cases, the features or characteristics of one or more plant(s) (such as health) may be determined based on a reflectance of the foliage of the plants within the enclosure.

At 1502, the system may disengage illuminators and obstruct viewing windows of the enclosure. For example, the system may cause any illumination within the enclosure to be deactivated. Similarly, the system may cause a viewing window to tint, frost, or the like and/or a screen to lower. In this manner, the system may reduce the amount of light within the enclosure.

At 1504, the system may cause a spectral sensor to capture first sensor data of the planting column. For instance, the planting column may rotate at least 360 degrees while the spectral sensor is engaged such that the spectral sensor can capture a full view of all plants, planting receptacles, and the like associated with the planting column while the illumination within the enclosure is reduced.

At 1506, the system may determine baseline reflectance data of at least one plant associated with the planting receptacles of the planting column. For example, the system may determine a region of interest associated with an individual plant, such as based on a known arrangement of the planting column and/or planting receptacles or via, for example, a segmentation and/or classification of the sensor data.

At 1508, the system may engage an illuminator. For example, the illuminator may be associated or configured to output illumination at specific or known characteristics. In some cases, the illumination may be directed at a desired plant or region of interest. In other cases, the illuminator may be directed at the planting column in general.

At 1510, the system may engage or reengage the spectral sensor to capture second sensor data of the planting column. For instance, the planting column may again rotate at least 360 degrees while the spectral sensor is engaged such that the spectral sensor captures a full view of all plants, planting receptacles, and the like associated with the planting column. However, in this example, the second sensor data is representative of the planting column and plants while the illuminator is engaged or active.

At 1512, the system may determine reflected response data of at least one plant based at least in part on the second sensor data. For example, the system may utilize the same region of interest associated with the individual plant, such as based on a known arrangement of the planting column and/or planting receptacles or via, for example, a segmentation and/or classification of the sensor data to determine the reflected response data.

At 1514, the system may determine resulting reflectance data based at least in part on the baseline reflectance data and the reflected response data. For example, the resulting reflectance data may represent a difference between the baseline reflectance data and the reflected response data.

At 1516, the system may determine at least one characteristic of the at least one plant based at least in part on the resulting reflectance data. For example, the system may utilize the resulting reflectance data to determine a health of the plant and/or a life stage by comparing the resulting data to historical data and/or expected reflectance data (in some cases, expected reflectance data based on plant type).

Figure 16:
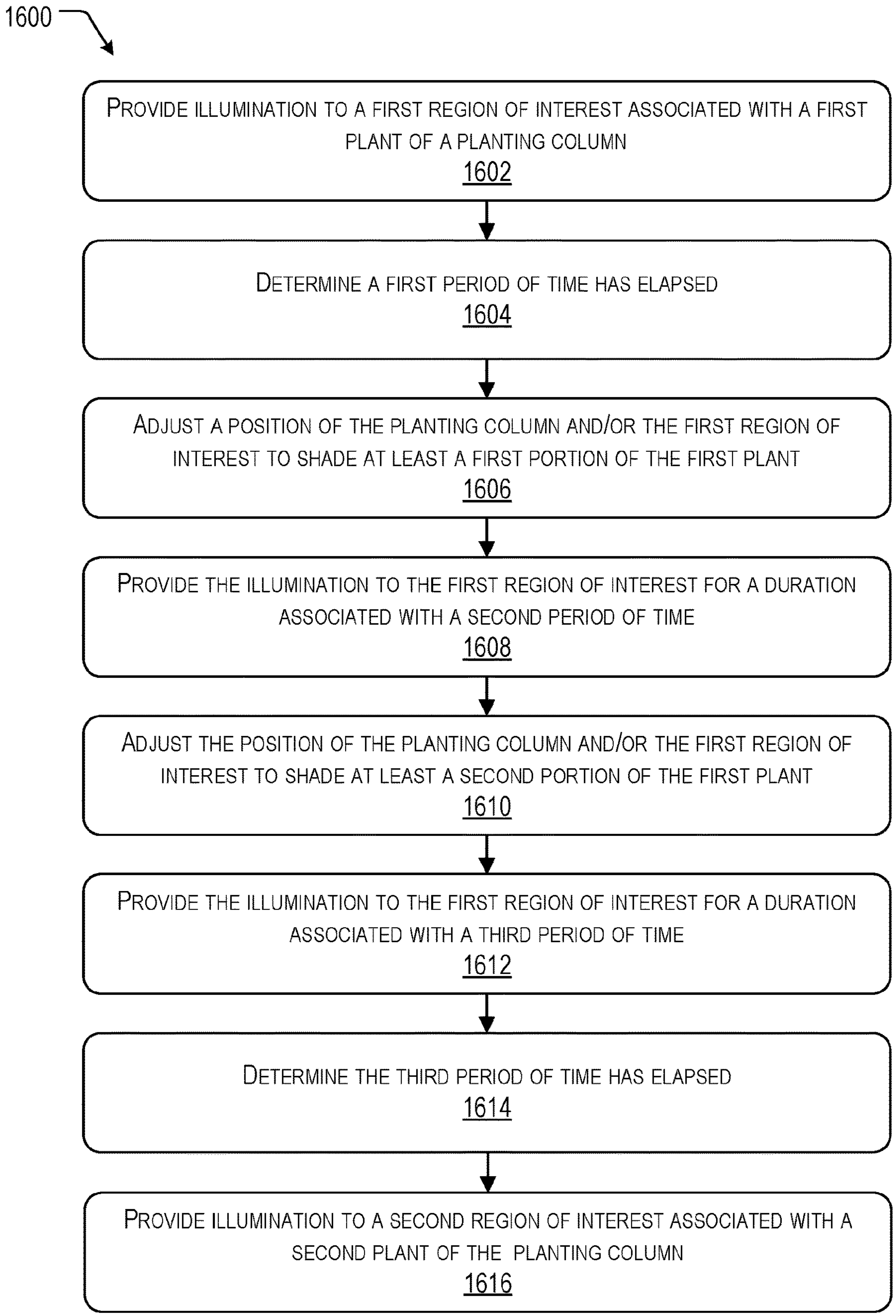
FIG. 16 is another example flow diagram showing an illustrative process for triggering a shade avoidance response from individual plants according to some implementations.

FIG. 16 is another example flow diagram showing an illustrative process 1600 for triggering a shade avoidance response from individual plants according to some implementations. In some cases, the illumination system such as the lighting and control column discussed above may be utilized to trigger a shade avoidance response in individual plants and thereby encourage increased growth or otherwise accelerated growth.

At 1602, the system may cause one or more illuminator associated with an enclosure may provide illumination to a first region of interest associated with a first plant of a planting column. As discussed above, the region of interest may be associated with the first plant (such as defined by classification and segmentation of sensor data repressing the first plant) and/or associated with a specific planting receptacle.

At 1604, the system may determine a first period of time has elapsed. For example, the illuminator may provide illumination to the first region of interest for the first period of time at a desired illumination setting (e.g., wavelength, intensity, and the like).

At 1606, the system may adjust a position of the planting column and/or the first region of interest to shade at least a first portion of the first plant. For example, the system may cause the planting column to rotate, tilt, or otherwise adjust following the expiration of the first period of time. Alternatively, the system may adjust the first region of interest by adjusting a field of illumination associated with the one or more illuminators. In some cases, the adjustment may be configured to cause at least a partial shading of the first plant. In one example, the system may utilize sensor data captured during the first period of time and/or during a transition period between the first period of time and a second subsequent period of time to determine an amount of shade resulting from adjusting the field of illumination, the region of interest, and/or the position of the planting column. In this example, the system may complete the adjustment in response to detecting a desired shade amount or percentage (e.g., a desire portion of the plant is shaded by greater than or equal to a threshold amount of the plant, a desired feature(s), such as a leaf, is shaded, and/or the like).

At 1608, the system may cause the one or more illuminator to provide illumination to the first region of interest (e.g., the adjusted region) for a duration associated with a second period of time. In some cases, the system may also adjust one or more features or characteristics, or settings of the illumination provided within the second period of time, as discussed above. In this example, the illumination provided to the first plant during the first period of time may differ from the illumination provided to the first plant during the second period of time. In some examples, the length or duration of the first period of time and the second period of time may also vary.

In this example, by shading portions of the first plant, the system may cause or trigger a shade avoidance response of the plant which may cause accelerated and/or increased growth. In some cases, by shading desired features of the first plant, the system may cause the first plant to grow in a desired manner, location, and/or direction.

At 1610, the system may again adjust the position of the planting column and/or the first region of interest to shade at least a second portion of the first plant. Again, the system may cause the planting column to rotate, tilt, or otherwise adjust following the expiration of the first period of time. Alternatively, the system may adjust the first region of interest by adjusting a field of illumination associated with the one or more illuminators. In some cases, the adjustment may be configured to cause at least a partial shading of the first plant. In one example, the system may utilize sensor data captured during the second period of time and/or during a transition period between the second period of time and a third subsequent period of time to determine an amount of shade resulting from adjusting the field of illumination, the region of interest, and/or the position of the planting column. In this example, the system may complete the adjustment in response to detecting a desired shade amount or percentage (e.g., a desire portion of the plant is shaded by greater than or equal to a threshold amount of the plant, additional desired feature(s), such as a second leaf, is shaded, and/or the like). In this example, the shaded amount following the second adjustment may differ from the desired shaded amount associated with the first adjustment at 1606.

At 1612, the system may cause the one or more illuminator to provide illumination to the first region of interest (e.g., the re-adjusted region) for a duration associated with a third period of time. In some cases, the system may also adjust one or more features or characteristics, or settings of the illumination provided within the second period of time, as discussed above. In this example, the illumination provided to the first plant during the third period of time may differ from the illumination provided to the first plant during the first period of time and/or the second period of time. In some examples, the length or duration of the third period of time and the second period of time and/or the first period of time may also vary.

In this example, by shading second portions of the first plant, the system may further cause or trigger the shade avoidance response of the first plant which may cause accelerated and/or increased growth. In some cases, by shading desired features of the first plant in a desired rotation or pattern, the system may cause the first plant to grow in a desired manner, location, and/or direction.

At 1614, the system may determine the third period of time has elapsed and, at 1616, the system may cause the one or more illuminators to provide illumination to a second region of interest associated with a second plant of the planting column. For example, the system may determine that the illumination provided during the first, second, and third periods of time are sufficient for the first plant based on the health, user preferences, maturity, size, and the like and proceed to provide illumination to other plants (e.g., the second plant) within the enclosure.

Figure 17:
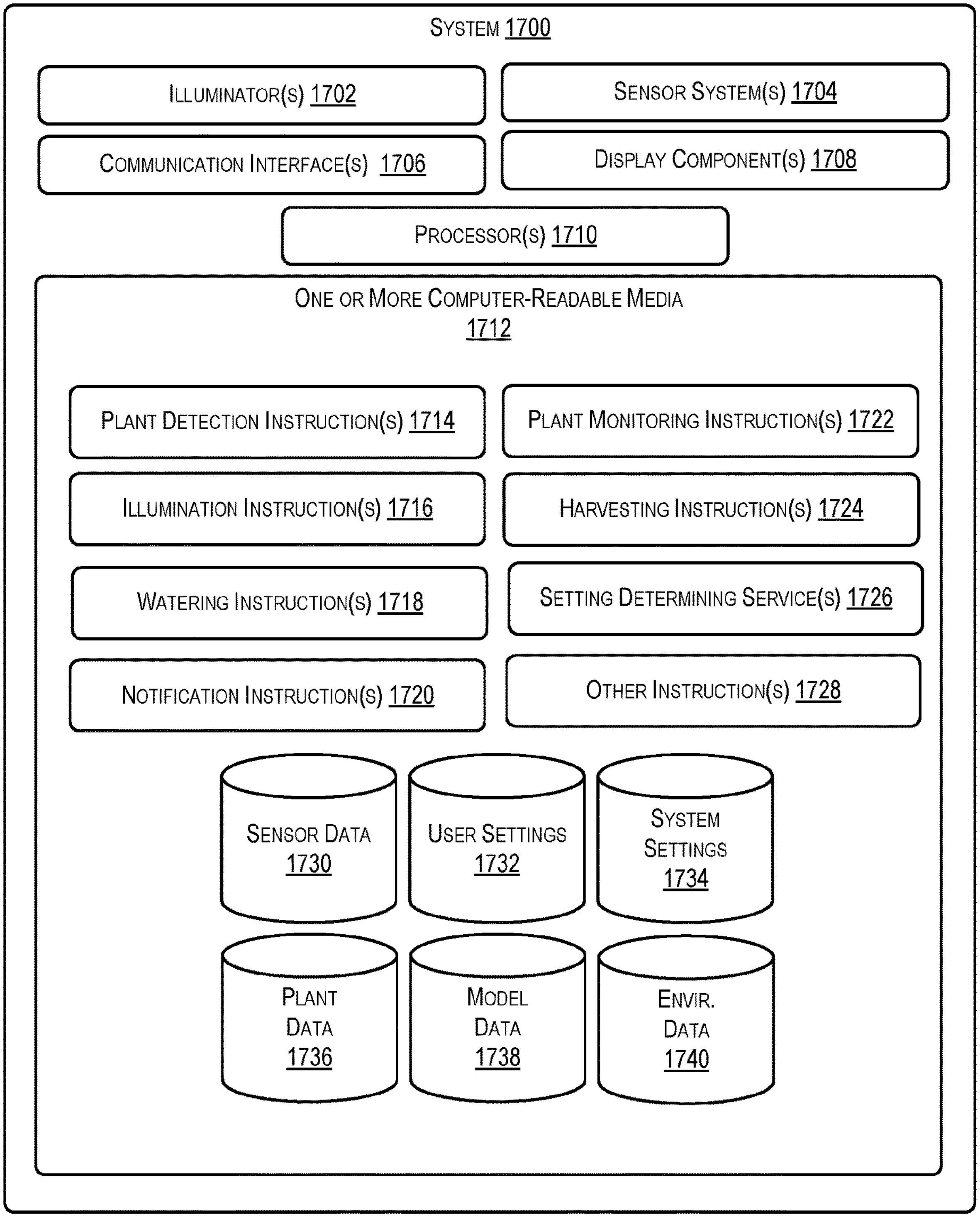
FIG. 17 is an example diagram of a control system associated with the enclosure of FIG. 1 according to some implementations.

In the process 1600 the system provides illumination to the first plant in three phases. However, it should be understood that the number of phases, periods of time, and the like may vary based on the user presences, capacity and utilization of the enclosure and/or planting column, density of the plants, feature of the plants (e.g., health, size, maturity, and the like), the capabilities of the enclosure (e.g., number of illuminators), and the like. FIG. 17 is another example system 1700 according to some implementations. For example, in some cases, the system may be an enclosure for growing plants. In some cases, the enclosure may include mechanical systems such as a rotatable planting column, environmental control systems, as well as access doors or compartments for accessing the internal space defined by the enclosure.

The system 1700 may include one or more illuminators 1702. The illuminators 1702 may be mounted through the interior of the enclosure in order to provide illumination to one or more plants within the enclosure. In some cases, the illuminators 1702 may be positioned along a lighting and control column as discussed above. The illuminators 1702 may include, but are not limited to, illuminators within the visible lights, infrared illuminators, ultraviolet lights, and the like. In some cases, the illuminators may have an adjustable field of illumination. In these cases, the illuminators 1702 may include a pan, tilt, zoom, and/or other adjustable features. The illuminators 1702 may also have adjustable intensity and wavelengths.

The system 1700 may also include one or more sensors 1704. The sensor systems 1704 may include image devices, spectral sensors, lidar systems, depth sensors, thermal sensors, infrared sensors, or other sensors capable of generating data representative of a physical environment. For example, the sensors 1704 may be positioned within the enclosure or in association with a lighting and control column to capture multiple frames of data from various perspectives. As discussed above, the sensors 1704 may be of various sizes and quality, for instance, the sensors 1704 may include image components may include one or more wide screen cameras, 3D cameras, high definition cameras, video cameras, among other types of cameras.

The system 1700 may also include one or more communication interfaces 1706 configured to facilitate communication between one or more networks, one or more cloud-based system(s), and/or one or more mobile or user devices. In some cases, the communication interfaces 1706 may be configured to send and receive data associated with the enclosure. The communications interfaces(s) 1706 may enable Wi-Fi-based communication such as via frequencies defined by the IEEE 802.11 standards, short range wireless frequencies such as Bluetooth, cellular communication (e.g., 2G, 3G, 4G, 4G LTE, etc.), satellite communication, dedicated short-range communications (DSRC), or any suitable wired or wireless communications protocol that enables the respective computing device to interface with the other computing device(s).

In the illustrated example, the system 1700 also includes an input and/or output interface 1708, such as a projector, a virtual environment display, a traditional 2D display, buttons, knobs, and/or other input/output interface. For instance, in one example, the interfaces 1708 may include a flat display surface, such as a touch screen or LED display configured to allow a user of the system 1700 to consume content (such as plant health updates, harvesting reminders, recipe suggestions, and the like) associated with the enclosure as well as to input settings or user preferences.

The system 1700 may also include one or more processors 1710, such as at least one or more access components, control logic circuits, central processing units, or processors, as well as one or more computer-readable media 1712 to perform the function associated with the virtual environment. Additionally, each of the processors 1710 may itself comprise one or more processors or processing cores.

Depending on the configuration, the computer-readable media 1712 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1710.

Several modules such as instruction, data stores, and so forth may be stored within the computer-readable media 1712 and configured to execute on the processors 1710. For example, as illustrated, the computer-readable media 1712 may store plant detection instructions 1714, illumination instructions 1716, watering instructions 1718, notification instructions 1720, plant monitoring instructions 1722, harvesting instructions 1724, setting determining instructions 1726, as well as other instructions 1728. The computer-readable media 1712 may also store data such as sensor data 1730, user settings 1732, system settings 1734, plant data 1736, model data 1738 (such as machine learned models and physical models of the planting column and/or enclosure), and environmental data 1740 (e.g., both internal and external to the enclosure).

The plant detection instructions 1714 may be configured to utilize the sensor data 1730 to detect insertion events associated with one or more seed cartridge(s) as well as to detect plants when the system 1700 is scanning prior to providing customized illumination. In some cases, the plant detection instructions 1714 may also be configured to determine a plant type and/or size via one or more machine learned model(s) that may segment and classify the sensor data.

The illumination instructions 1716 may be configured to select planting receptacles and/or plants within the enclosures and to provide illumination at customized settings as discussed herein. For example, the illumination instructions may cause one or more of the illuminators 1702 to provide a field of illumination directed at specific regions of interest, plants, and/or planting receptacles.

The watering instructions 1718 may be configured to control the amount of water and/or humidity being provided to the plants within the planting column. In some cases, the watering instructions 1718 may be provided for the system 1700 as a whole, while in other cases, the watering instructions 1718 may provide customized water to each individual plant and/or planting receptacle in a manner similar to that discussed with respect to illumination.

The notification instructions 1720 may be configured to provide notifications and/or alerts to an owner or user of the system 1700. For example, the notification instructions 1720 may cause notifications to be sent to a user device associated with the system 1700 via the communication interfaces 1706. In some cases, the notifications may include harvest alerts, health alerts, setting change alerts, and the like.

The plant monitoring instructions 1722 may be configured to monitor the health, size, and/or life stage of the plants as they mature within the enclosure. For example, the plant monitoring instructions 1722 may utilize the sensor data 1730, model data 1738, and/or environmental data 1740 to generate plant data 1736 associated with one or more statuses or historical status of the plants within the enclosure.

The harvesting instructions 1724 may be configured to determine a harvest time or window for the plants within the enclosure. For instance, the harvesting instructions 1724 may determine from the plant data, the sensor data, and/or one or more thresholds (such as a total size threshold, leaf size threshold, period of time threshold, or the like) that a particular plant is ready to harvest and cause the notification instructions 1720 to send an alert to the user.

The setting determining instructions 1726 may be configured to determine one or more settings associated with the enclosure. For example, the setting determining instructions 1726 may determine illumination settings, such as intensity, length of time, wavelength, and the like to provide to each individual plant, as discussed above.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer readable media storing instructions executable by one or more processors, which when executed, cause the one or more processors to perform operations comprising:

causing a viewing window of an enclosure to become obstructed;

receiving second sensor data associated with a planting column of the enclosure while the viewing window is obstructed;

determining, based at least in part on the second sensor data, baseline reflectance data associated with a first plant;

receiving first sensor data associated with the planting column of the enclosure, the planting column including a marker and the first sensor data including data associated with the marker associated with the planting column;

determining, based at least in part on the first sensor data, a position of the marker;

determining, based at least in part on the first sensor data and the marker, a first area of interest associated with the first plant and the planting column;

determining a first illumination setting associated with a first illuminator based at least in part on the first plant and the baseline reflectance data associated with the first plant and a second illumination setting associated with a second illuminator; and causing, based at least in part on the first illumination setting, a first illuminator to provide first illumination to the first plant; and causing, based at least in part on the second illuminator setting, a second illuminator to provide second illumination to a second plant, the first illumination different than the second illumination.

2. One or more non-transitory computer readable media of claim 1, wherein the operations further comprise:

determining, based at least in part on the first sensor data, a first feature associated with the first plant; and wherein the first illumination setting is based at least in part on the first feature.

3. The one or more non-transitory computer readable media of claim 1, wherein the operations further comprise:

receiving second sensor data associated with the planting column of the enclosure, the second sensor data received prior to the first sensor data;

determining, based at least in part on the second sensor data, an insertion event associated with a seed cartridge;

determining, based at least in part on the second sensor data, a seed receptacle of the planting column to associate with the seed cartridge; and wherein determining the first area of interest is based at least in part on the seed receptacle.

4. The one or more non-transitory computer readable media of claim 1, wherein the operations further comprise:

receiving second sensor data associated with the planting column;

determining, based at least in part on the second sensor data, a second area of interest associated with a second plant and the planting column;

determining, based at least in part on the second plant, a second illumination setting; and causing, based at least in part on the second illumination setting, the illuminator to provide second illumination to the second plant, the second illumination different than the first illumination.

5. The one or more non-transitory computer readable media of claim 1, wherein causing the second illuminator to provide second illumination to the second plant is concurrently with causing the first illuminator to provide first illumination to the first plant.

6. The one or more non-transitory computer readable media of claim 1, wherein the first illuminator is a visible light illuminator and the second illuminator is an infrared illuminator.

7. The one or more non-transitory computer readable media of claim 1, wherein the planting column includes a plurality of planting receptacles arranged in row and columns and the marker is associated with a particular one of the plurality of planting receptacles.

8. A method comprising:

causing a viewing window of an enclosure to become obstructed;

receiving second sensor data associated with a planting column of the enclosure while the viewing window is obstructed;

determining, based at least in part on the second sensor data, baseline reflectance data associated with a first plant;

receiving first sensor data associated with the planting column of the enclosure, the planting column including a marker and the first sensor data including data associated with the marker associated with the planting column;

determining, based at least in part on the first sensor data, a position of the marker;

determining, based at least in part on the first sensor data and the marker, a first area of interest associated with the first plant and the planting column;

determining a first illumination setting associated with a first illuminator based at least in part on the first plant and the baseline reflectance data associated with the first plant and a second illumination setting associated with a second illuminator; and causing, based at least in part on the first illumination setting, a first illuminator to provide first illumination to the first plant; and causing, based at least in part on the second illuminator setting, a second illuminator to provide second illumination to a second plant, the first illumination different than the second illumination.

9. The method of claim 8, further comprising:

determining, based at least in part on the first sensor data, a first feature associated with the first plant; and wherein the first illumination setting is based at least in part on the first feature.

10. The method of claim 8, further comprising:

receiving second sensor data associated with the planting column of the enclosure, the second sensor data received prior to the first sensor data;

determining, based at least in part on the second sensor data, an insertion event associated with a seed cartridge;

determining, based at least in part on the second sensor data, a seed receptacle of the planting column to associate with the seed cartridge; and wherein determining the first area of interest is based at least in part on the seed receptacle.

11. The method of claim 8, further comprising:

receiving second sensor data associated with the planting column;

determining, based at least in part on the second sensor data, a second area of interest associated with a second plant and the planting column;

determining, based at least in part on the second plant, a second illumination setting; and causing, based at least in part on the second illumination setting, the illuminator to provide second illumination to the second plant, the second illumination different than the first illumination.

12. The method of claim 8, wherein causing the second illuminator to provide second illumination to the second plant is concurrently with causing the first illuminator to provide first illumination to the first plant.

13. The method of claim 8, wherein the first illuminator is a visible light illuminator and the second illuminator is an infrared illuminator.

14. A system comprising:

one or more processors; and one or more non-transitory computer readable media storing instructions executable by the one or more processors, wherein the instructions, when executed, cause the system to perform operations comprising:

causing a viewing window of an enclosure to become obstructed;

receiving second sensor data associated with a planting column of the enclosure while the viewing window is obstructed;

determining, based at least in part on the second sensor data, baseline reflectance data associated with a first plant;

receiving first sensor data associated with the planting column of the enclosure, the planting column including a marker and the first sensor data including data associated with the marker associated with the planting column;

determining, based at least in part on the first sensor data, a position of the marker;

determining, based at least in part on the first sensor data and the marker, a first area of interest associated with the first plant and the planting column;

determining a first illumination setting associated with a first illuminator based at least in part on the first plant and the baseline reflectance data associated with the first plant and a second illumination setting associated with a second illuminator; and causing, based at least in part on the first illumination setting, a first illuminator to provide first illumination to the first plant; and causing, based at least in part on the second illuminator setting, a second illuminator to provide second illumination to a second plant, the first illumination different than the second illumination.

15. The system of claim 14, wherein the operations further comprising:

determining, based at least in part on the first sensor data, a first feature associated with the first plant; and wherein the first illumination setting is based at least in part on the first feature.

16. The system of claim 15, wherein the operations further comprising determining, based at least in part on the first feature associated with the plant, that the first plant is within a harvest threshold.

17. The system of claim 14, wherein the operations further comprising:

receiving second sensor data associated with the planting column of the enclosure, the second sensor data received prior to the first sensor data;

determining, based at least in part on the second sensor data, an insertion event associated with a seed cartridge;

determining, based at least in part on the second sensor data, a seed receptacle of the planting column to associate with the seed cartridge; and wherein determining the first area of interest is based at least in part on the seed receptacle.

18. The system of claim 14, wherein the operations further comprising:

receiving second sensor data associated with the planting column;

determining, based at least in part on the second sensor data, a second area of interest associated with a second plant and the planting column;

determining, based at least in part on the second plant, a second illumination setting; and causing, based at least in part on the second illumination setting, the illuminator to provide second illumination to the second plant, the second illumination different than the first illumination.

19. The system of claim 14, wherein causing the second illuminator to provide second illumination to the second plant is concurrently with causing the first illuminator to provide first illumination to the first plant.

20. The system of claim 14, wherein the first illuminator is a visible light illuminator and the second illuminator is an infrared illuminator.

* * * * *